KEY WORD DIGIT DECODER

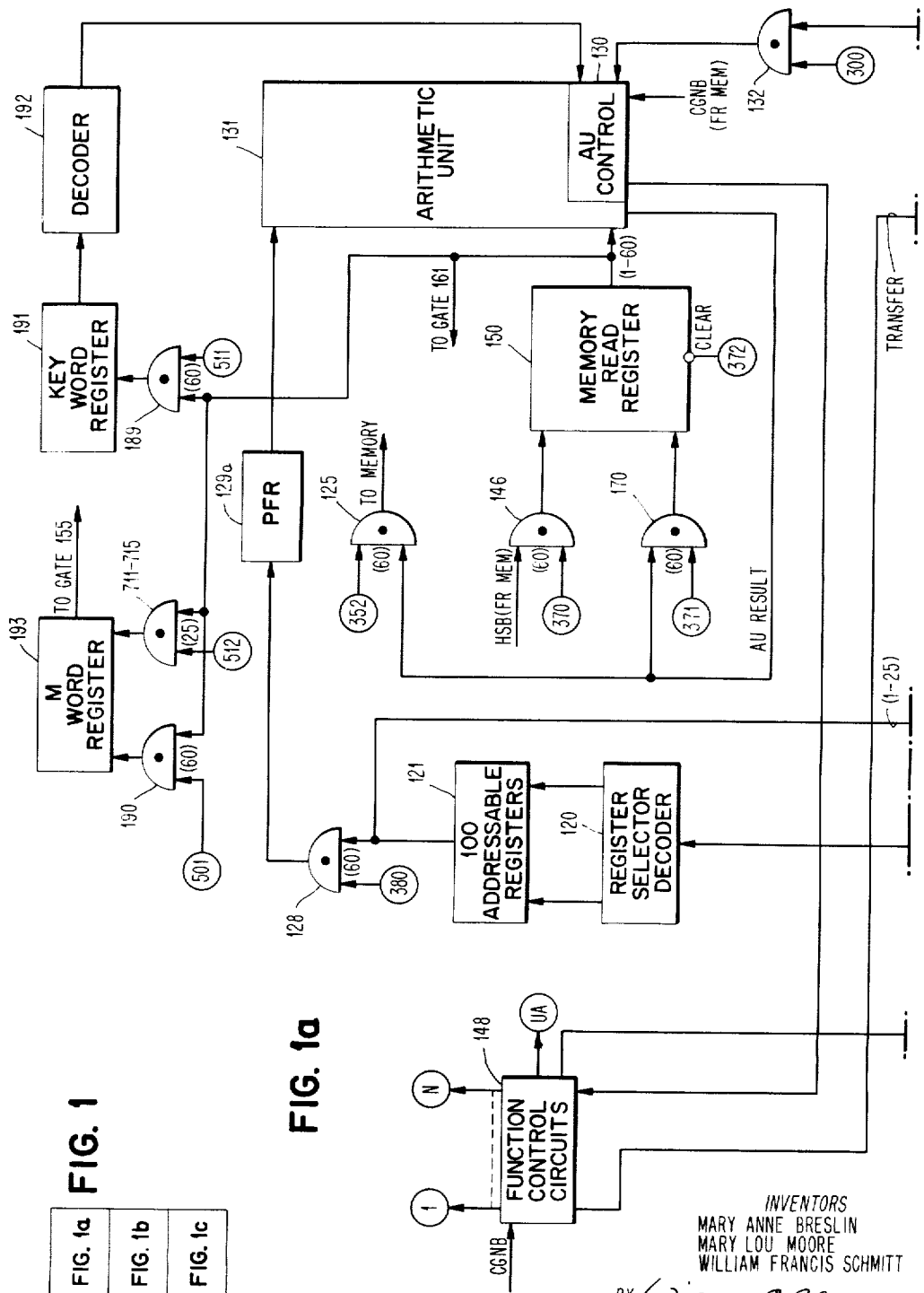

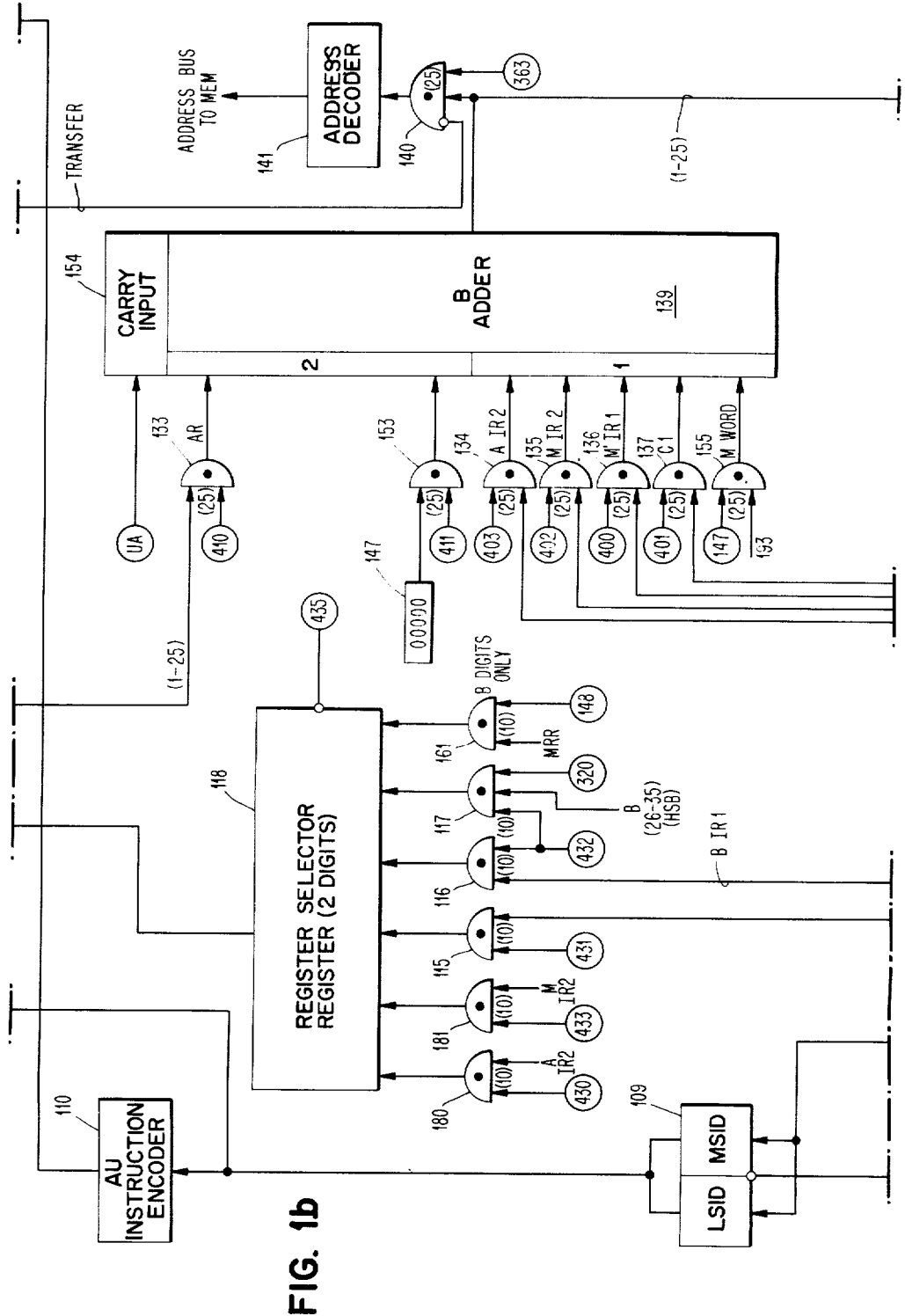

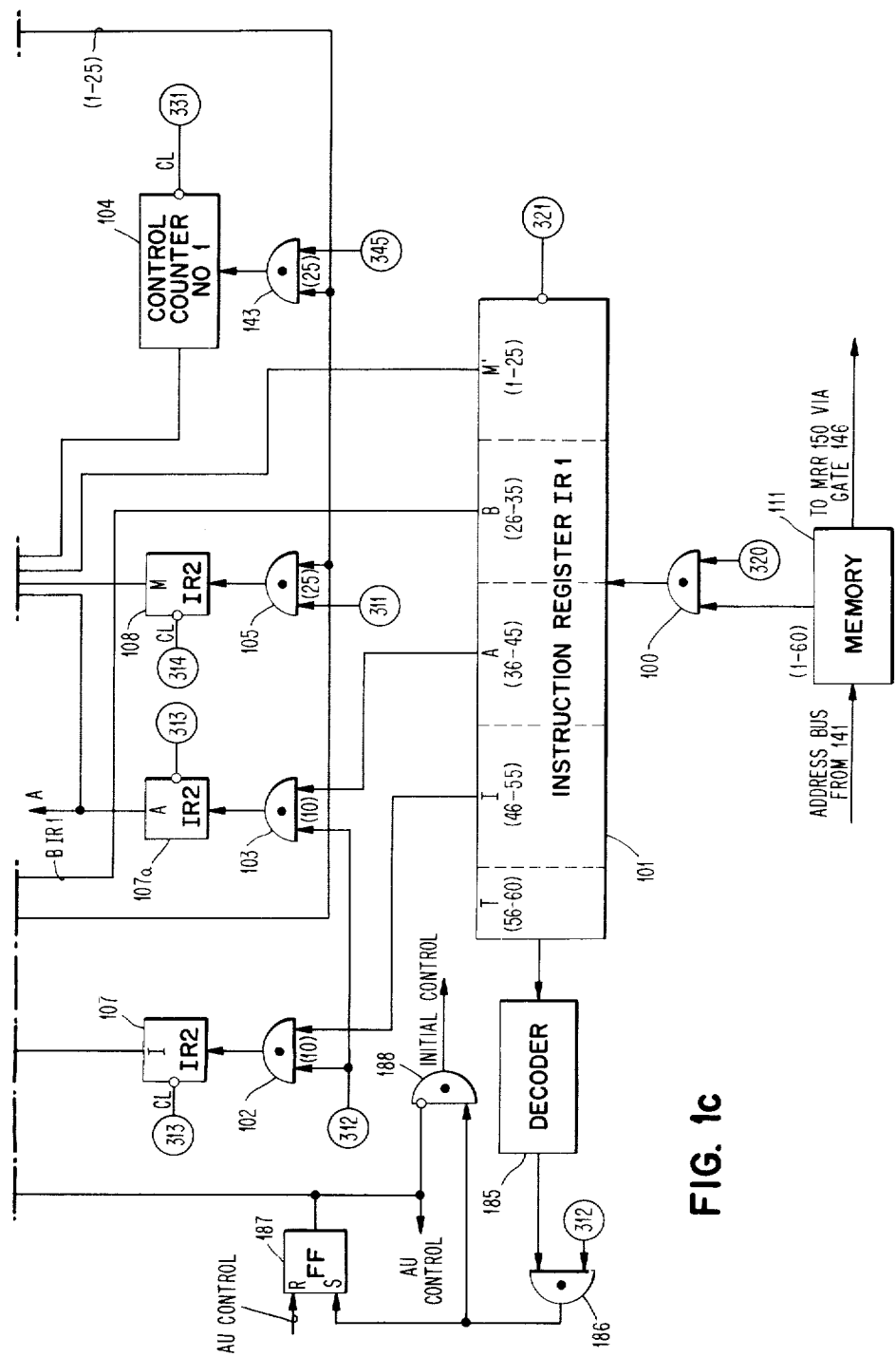

United States Patent Office 3,201,761
Patented Aug. 17, 1965

3,201,761
INDIRECT ADDRESSING SYSTEM
William Francis Schmitt, Wayne, and Mary Anne Breslin, Philadelphia, Pa., and Mary Lou Moore, Livermore, Calif., assignors to Sperry Rand Corporation, New York, N.Y., a corporation of Delaware
Filed Aug. 17, 1961, Ser. No. 132,044
14 Claims. (Cl. 340—172.5)

This invention relates to data processing systems and more particularly to a system which employs an indirect addressing operation.

In a data processing system, information is stored in a memory device or memory devices. When particular information is to be extracted from the memory device, the memory location, where such information is stored, is "addressed" or activated. Thereafter, the information is transmitted from the memory to the component in the system which is requesting it. For instance, the information might be transmitted from the memory to an arithmetic unit.

A data processing system responds to command information, referred to as "instructions," and these system instructions very often make up part of the data stored in the memory. A common method of extracting instruction data from the memory is by the operation of a control counter. The address of the first required instruction is set in the control counter by the programmer or by a system operation. The control counter transmits the address to the memory and the instruction information is extracted accordingly. Thereafter the instruction address in the control counter is increased by one (i.e., every time an instruction is completed) so that the addresses of the instructions are selected sequentially. Accordingly it is preferable to have the instruction information for a particular operation located at sequential addresses in the Memory.

Indirect addressing means enable a data processing system to sequentially select instructions whose respective principal memory addresses are not in sequence. An indirect address register is usually made available and the addresses of information located in this register are fixed. However, the information which is stored in each indirect address register location represents a principal memory address of a required instruction. The principal memory address information can be easily entered and erased from the indirect address register locations. Hence, when the necessary instructions to perform a data processing operation are known by the programmer or determined by the system, the principal memory addresses of these instructions are regarded as information data and can be entered into the indirect address register. In other words, if the instructions which are required to perform data processing operations are determined, the principal memory address of each instruction is placed in a data location in the indirect address register. In the indirect address register each location has an address which has a fixed relationship to every other location address in the indirect address register. When the data processing operation is to take place the address of the indirect address register location containing the principal memory address of the first required instruction is placed in the control counter. This indirect address information is processed and in effect brings from the indirect address register the information representing the principal memory address of the first required instruction. The principal memory address of the first required instruction in turn is processed and brings data from a principal memory location, this data being the necessary information (possibly an operand) to perform the first operation. When this instruction is complete, the control counter is increased by one and the information residing in the location identified by the next sequential address in the indirect address register is extracted. The principal memory address of the second instruction, located at this second indirect-address register address can be, and in all probability will be, vastly different from the principal memory address of the first instruction. The principal memory address of this second instruction in all likelihood could not have been obtained by simply increasing the principal memory address of the first instruction by an increment of one. In this manner the principal memory addresses (for instructions to accomplish a particular operation) which are not in sequence can be obtained or selected by sequentially addressing the indirect-address register.

The above described indirect addressing scheme is limited to one level of indirect addressing after which an operation is completed before the next level of indirect addressing is initiated. The present invention provides a means for multiple levels of indirect addressing in anticipation of a single operation.

Accordingly, it is an object of the present invention to provide an improved method of extracting information from the data storage means.

It is a further object of the present invention to provide a means for effecting multiple levels of indirect addressing.

In accordance with a feature of the present invention a keyword register is provided which stores keywords, whereby each digit of each keyword initiates at least one level of indirect addressing.

In accordance with another feature of the present invention there is provided a keyword decoding means which analyzes each digit of the keyword and generates proper function signals in accordance therewith to determine the routines of the levels of indirect addressing.

In accordance with another feature of the present invention a double address register is provided which stores the information selected by one level of indirect addressing and provides a choice of addresses, for a subsequent level of indirect addressing, from such information. The address which is chosen at each level of indirect addressing is determined by the analysis of the keyword digit which was present prior to the time that the double address information is extracted from the memory.

In accordance with another feature of the present invention a sentinel bit register is provided which serves to monitor the progress of the keyword analysis. If all the keyword digits are analyzed and the indirect addressing procedure has not been terminated the sentinel register initiates the selection of another keyword.

The foregoing and other objects and features of this invention and the manner of attaining them will become more apparent and the invention itself will be best understood by reference to the following description of an embodiment of the invention taken in conjunction with the accompanying drawings, in which:

FIG. 1 (*a*, *b* and *c*) is a schematic block diagram of the present system as used with a data processing system.

Figure 2:
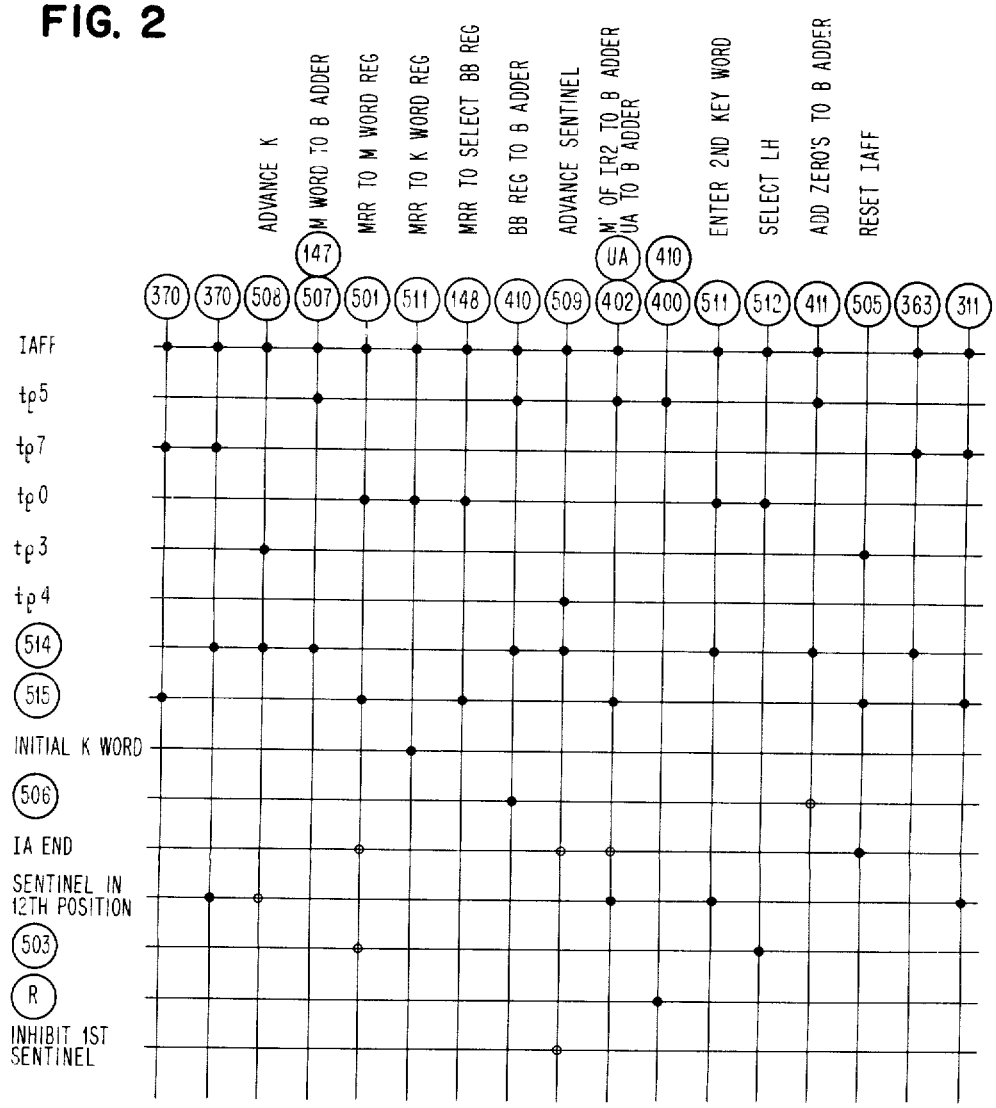
FIG. 2 is a schematic of a matrix generator for generating function table signals.

The present invention deals with an indirect addressing system which can be used with the data processing systems described in U.S. patent application, "Computer Cycling and Control System" by J. P. Eckert et al., Serial Number 131,449, filed March 24, 1961, and in U.S. patent application, "Digital Computing System" by J. P. Eckert, et al., Serial Number 98,148, filed March 24, 1961. The present system is very closely related to the systems described in these last-mentioned patent applications and therefore wherever possible corresponding figures and corresponding component identifications are used in the present description. The above-mentioned applications provide a detailed description of many of the present system components, such as the core memory, the adders, etc. Since the novel aspects of the present invention are not primarily dependent on the components described in these last-mentioned applications the description of many of the components of the present system will be made by reference to these two above-identified applications and in particular to the application entitled "Computer Cycling and Control System." However it is to be understood that other well known components or devices, used in data processing systems, might well be used. For instance an addressable register might be similar to the binary registers described in the text, "Pulse and Digital Circuits," by Millman and Taub, published in 1956 by McGraw-Hill Book Co., New York, N.Y.

It should be noted that this point that the present description, for simplicity of understanding, deals with registers and components which store bits in the well known 1-2-4-8 weighted binary-decimal form, with an additional bit for checking purposes. Other binary-decimal codes or straight binary codes can be accommodated. In this regard the system of the U.S. patent applications "Digital Computer System" and "Computer Cycling and Control System" employ unique binary-decimal codes, so that the presently described system actually employs a different coding scheme when used with the above mentioned systems. Therefore when reference is made to the operation of the present system with the above mentioned systems it can be considered that any one of the well known code translating devices is employed to render the systems compatible. It should be further understood that although there is no timing pulse generator shown, the $tp$ timing pulses are generated by the $tp$ pulse generator described in the U.S. patent application "Digital Computing System," above or can be generated by a similar device.

Before examining the detailed description of the circuitry consider the formats of certain information words to be handled in the present system and certain of the ground rules for the system operation. An instruction which the system of the "Computer Cycling and Control System" application will be handling will take the form of TIIAABBM'M'M'M'M'. The T position is the most significant digit position in a twelve digit instruction word. Normally, in the instruction word, the T position indicates whether or not the system will go into a tracing mode of operation. However, the T position is used in the present scheme to indicate to the data processing system that an indirect addressing operation is about to take place. This is accomplished by inserting an "Ignore" digit notation (or any other special symbol) in the T digit position. The "Ignore" digit is detected and the system is transferred into an indirect addressing operation as will be fully described hereinafter. The information in the II digita positions of the instruction represents a two digit number 00 through 99 and indicates which operation is to be followed, such as add, subtract, transfer, etc. The information in the AA digit positions of the instruction represents a two digit number which designates an addressable register (one of the 100 addressable registers 121 in FIG. 1a). The information in the BB digit positions of the instruction likewise indicates a two digit number 00 through 99 and represents an addressable register (one of the 100 addressable registers 121 in FIG. 1a). The information contents of the addressable registers designated by the AA and BB positions are very often used to provide operands for the operations and, as will become apparent in the description of the present scheme, the contents of an addressable register will be used to alter an address of a memory location.

The five M' digits of the instruction word designate the address of information stored in the principal memory. The information stored at the M' address is usually an operand which is to be subjected to an operation in accordance with the information in the II positions of the particular instruction in the instruction register. Very often, for instance, in an addition procedure the II position information indicates that an add operation will take place and the information in the addressable register designated by the AA digits is the information of the addend while the operand or the information designated by the M' address is the augend.

The format of certain words which are particularly related to the indirect addressing operation varies slightly from the format just described. Initially, when an indirect addressing operation commences, the M' digits of the instructions are transmitted to the principal memory to extract a keyword therefrom. The format of the first keyword is KKKKKBBMMMMM. Each of the K digits in the keyword is analyzed by decoding circuitry to be described hereinafter. The analysis of the individual keyword digits provides for certain operations to take place in multiple levels of indirect addressing. Initially, there are only five keyword digits provided, however if each of these keyword digits is analyzed and none of them indicates that the indirect addressing operation should come to a halt, then a second keyword is extracted from the principal memory. The second keyword contains twelve keyword digits and each of these is analyzed until a keyword digit finally indicates that indirect addressing should be terminated. Further keywords may be extracted if necessary. It becomes clear that as many levels of indirect addressing as might be necessary are available under this present indirect addressing scheme.

The BB digits of the first keyword as was mentioned earlier provide for the selection of a particular BB register (addressable register) whose contents are used to modify the M digit address of the first keyword. It is possible that the contents of the BB register might well be zero and that the address represented by the M digits in the first keyword will not be altered, but remain the same as it was read in. The M digits in the first keyword are the address of the first M word which in itself will contain the two M addresses as will be described hereinafter.

Before discussing the role of the M word consider the possible analyses of the key digits. Each of the key digits (K) may have one of the values 0, 1, 4, 5, 6, or 9. If the key digit is five or greater, that is a 5, 6 or 9, it is an indication that the address in the M word register, at the time of the analysis, will be altered by the contents of an addressable or B register designated by the B digits. In addition to the key digit being analyzed, to determine if it is five or greater, it is examined to determine whether the system should: choose the right hand portion of the M–Word; or choose the left hand portion of the M–Word; or terminate the indirect addressing operation. If the keyword digit is 0 or 5 it indicates that the incoming address, or the incoming M word, which is selected by the present M address will have its left-hand portion chosen as the proper M address for the next level of indirect addressing. If the keyword digit is 1 or 6 it means that the right-hand portion of the incoming M word will be chosen as the correct address for the succeeding level of indirect addressing. If the keyword digit is 4 or 9 it means that the indirect addressing should be terminated and that the operand extracted by the current address is the operand that the indirect addressing operation has been seeking.

The M word is a word which contains two M portions and a BB portion according to the format

MMMMMBBMMMMM.

The first five digits are M digits, the next two are B digits and the last five are M digits. The M word provides two addresses (a double address) and depending upon the analysis of the keyboard digit as just described, one or the other of the M portions is selected as the address of the succeeding indirect addressing level.

Throughout the description to follow there will be frequent references made to flip-flops, to registers, to adders, counters, etc. Excepting for the particular logic circuitry which deals directly with indirect addressing, as was suggested earlier, the flip-flops, register, adding units, and counters etc. will not be described in detail. It is to be understood that of any of the many types of flip-flops, counters, adders, registers, etc. which are well known in the computing art might well be used in this particular device and those particular units which are described in either or both of the U.S. patent applications entitled, "Computer Cycling and Control System" and "Digital Computing System" mentioned earlier may be used as examples of the particular units which are employed.

Throughout the description a single gate or a single logical component may be shown while in fact many such components are used. In such cases a number in parenthesis is placed alongside the components. The number in parenthesis indicates the number of such components being used, for instance gate 137 in FIGURE 1B represents 25 gates to accommodate a five digit word wherein each digit has five bits.

Also throughout the description flip-flops will be considered as having a one pulse delay and a "set" signal will take priority over a "reset" signal. In other words if a flip-flop receives a set signal and a reset signal simultaneously the flip-flop will be transferred to its set side.

Consider FIGURES 1a, 1b, and 1c together. Although no input and output equipment is shown, it is to be understood that input and output equipment is provided and can transmit information into the instruction register 101 or into the control counter 104 directly in accordance with a particular system program. With this premise in mind assume that there is a program underway which will involve indirect addressing (IA) and that the address of the instruction calling for IA in this particular program has been placed in control counter 104. The information is transferred from the control counter 104 through gates 137 into the B-adder 139 in response to a 401 function table signal being applied to said gate. The B-adder 139 is a parallel decimal adder and can be of the type described in chapter 8 of the text-book "Digital Computers" by R. K. Richards, published by the Van Nostrand Company in 1956. One role of the B-adder is to index or modify information being passed therethrough in order that greater flexibility in addressing can be obtained.

The initial IA instruction address having been transmitted to and through the B-adder, it is transmitted therefrom through the gates 140 to the Address Decoder 141 in response to a 303 functions table signal. The Address Decoder 141 is a typical decoder, well known in the art, and is specifically described in the patent application "Digital Computing System" mentioned earlier. For purposes of this description, the decoder can be considered as a device which includes a plurality of gates which accept a plurality of signals and produces a pair of signals therefrom. The pair of signals will be an "X" signal and a "Y" signal. These signals may be transmitted into the memory to address a particular location by a coincidence current technique requiring an "X" and a "Y" signal at the selected location. Further the Address Decoder 141 produces an output one pulse time after it receives an input pulse.

The address signals are transmitted from the Address Decoder 141 to the Memory 111 to extract therefrom the contents of the memory location which has the address originally located in the Control Counter 104. The Memory 111 can be a core type memory, and preferably is of the type described in the aforementioned application entitled "Digital Computing System." For the purposes of the description herein, it can be considered that the Memory 111 is a core type memory which enables information to be written and read therefrom with a coincidence current technique and stores approximately 100,000 bits. It can be seen in FIGURE 1 that the information from the Memory 111 can be read in response to the Address Decoder 141 into the IR-1 Instruction Register 101, or it can be read into the Memory Register 150 through gate 146. In the first situation, the information is transmitted through the gate 100 in response to the presence of function table signal 302 into the IR-1 instruction register 101 wherein it is to be stored.

As was mentioned earlier when the system is going to perform an indirect addressing operation the T position carries an "Ignore" designation therein. The Ignore designation for the purpose of this description has the binary form 11000 and is transmitted to the Decoder 185 where it is decoded. The output of Decoder 185 is transmitted (through gate 186) to transfer the indirect address control flip-flop (IAFF) 187 to its set side.

When the indirect address control flip-flop 187 is transferred to its set side it inhibits the Instruction Decoder 169, thereby disabling the system from interpreting the instruction, which normally would take place, until the indirect addressing has been completed. In other words, the system is temporarily stopped from continuing in accordance with the instruction information represented by the II digits in IR-1 until the proper operand is found and the proper operand is not determined until the indirect addressing operation has been completed. The output of gate 136 is transmitted to gate 188 the output of which generates the initial control signals. In addition, the indirect address control flip-flop 187 transmits a signal to help generate the "AU" control signals. The "AU" control section, a part of whose details will be more fully described hereinafter, provides signals to the function control circuits (FIGURE 2) which in turn provide "AU" function table signals. The function table signals provide the necessary control signals to accomplish the indirect addressing operation.

Assume now that the system has received an indication (by setting indirect addressing flip-flop 187) that an indirect addressing operation is to take place. The M' digits from the instruction register IR-1 are transmitted through gate 136 into the B-adder. In the B-adder 139 the address M' is modified by the contents of the addressable register 121 identified by the BB digits in the IR-1 register 101. The modified M' address is transmitted from the B-adder, through gates 140 and through the Address Decoder 141 to provide "X" and "Y" signals to the Memory 111. The information in the Memory location designated by the modified M' digits is extracted from the Memory 111 and transmitted to the Memory Read Register 150 via the gate 146. The gate 146 is rendered conductive by the function table signal 370 which has been generated in response to IAFF, tp7, and control signal 515 (see FIG. 2). Function table signal 320 is not generated at this time so that the information from the Memory will not be transmitted to the IR-1 Information Register 101.

The particular word (first keyword) selected by the modified M' digits in this first indirect addressing step is a word which has the following format

KKKKKBBMMMMM

This information is transmitted to the Memory Read Register 150. One pulse time later this information is transmitted from Memory Read Register 150 to gates 189 and 190. Gates 189 and 190 actually represent 60 gates each. In this particular instance since the first keyword is being extracted from the Memory, the function table signals 501 and 511 are both generated (as more fully explained later) and therefore the information is transmitted into both the Keyword Register 191 and the M-Word Register 193.

Figure 3:
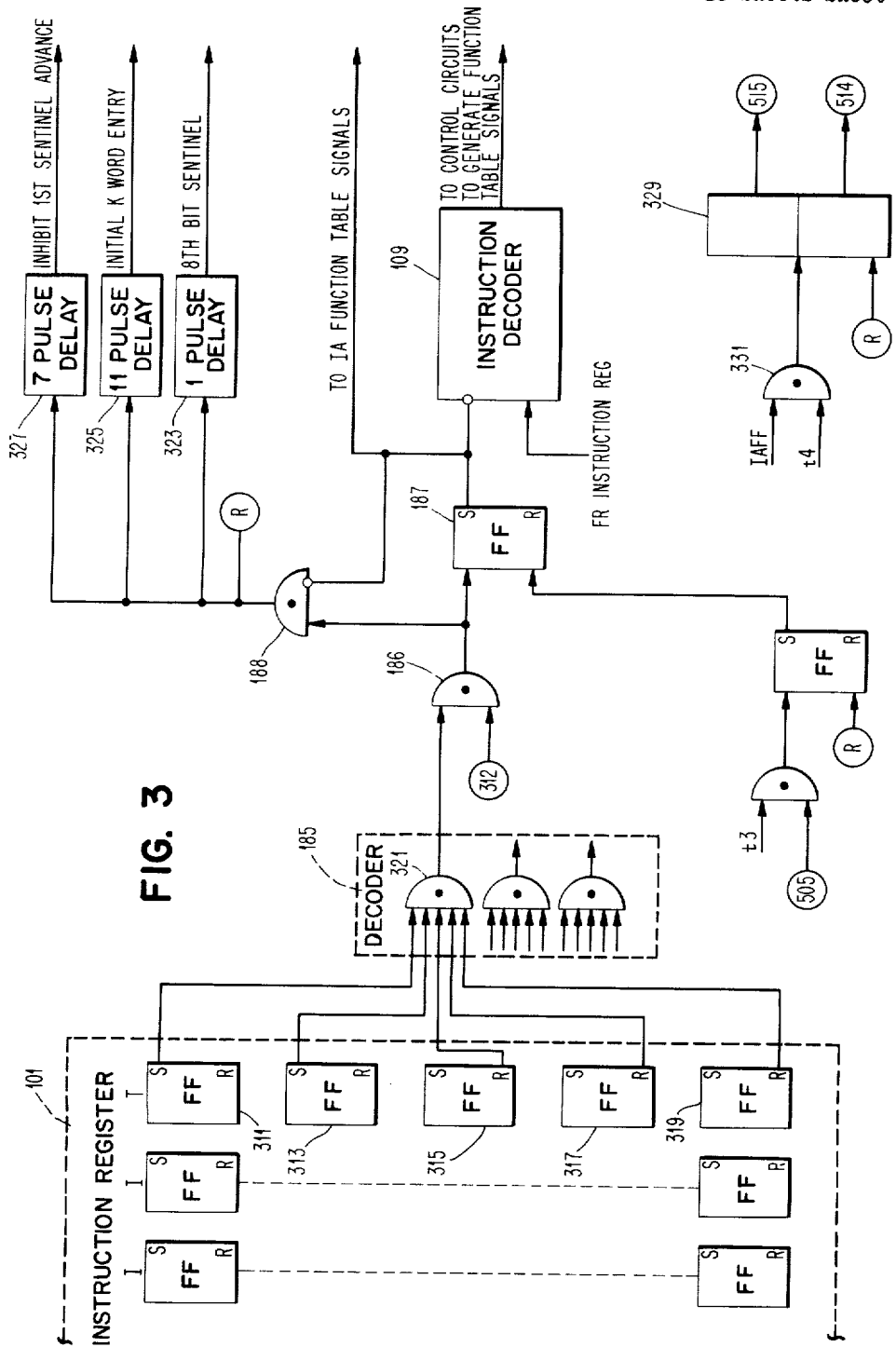
FIG. 3 is a schematic block diagram of circuits which generate the initial control signals.

The information in the Keyword Register 191 is shifted and transmitted from the high order position one digit at a time to Decoder 192 where it is decoded (or analyzed) and hereafter is transmitted to the Arithmetic Unit Control Section 130 to aid in generating the proper function table signals. The Decoder 192 can be any one of the devices well known in the art to effect a decoding operation while a particular one of such devices is depicted in FIGURE 3. As was described earlier in connection with the keyword format each digit of the keyword is analyzed or decoded. If a keyword digit is five or greater it determines that the address of the information which is extracted from the principal memory by the M digits of the first keyword or subsequently by the M digits from the M word, should be altered or indexed by the contents of an addressable register as will be more fully explained hereinafter.

Consider now the information which is transmitted from the Memory Read Register 150 through gates 190 to the M Word Register 193. The keyword is stored initially in both the Keyword Register 191 and the M word Register 193. Only the five least significant digit positions (the right-hand side) in the M Word Register are obtainable for a readout and the M digits therefrom are transmitted to gates 155 to be passed to the B-adder. If the M Word address is going to be indexed this will be accomplished in the B-adder 139 whereat the contents of one of the addressable registers 121 are added to the M Word address. Assuming for the moment that the M digits from the keyword are not to be altered in the B-adder, then zeros from the "Zero Generator" 147 are added in the B-adder to the M digits. Thereafter the digits from the B-adder are transmitted through gates 140 to the Address Decoder 141 to provide "X" and "Y" signals to extract, from the Memory 111, information which is found in the particular "X-Y" location. The word from the principal memory which is extracted in accordance with the address of the M digits of the Keyword is a word which has a format

MMMMMBBMMMMM as explained earlier. This information is transmitted, as was the keyword address information, to the Memory Read Register 150 via gates 146 in response to a function table signal 370. One pulse time later the information is transmitted from the Memory Read Register 150 through gates 190 to the M word Register 193. Function table signal 511 is not generated at this time so that the M word is transmitted only to M-word Register and not the Keyword Register.

If the analysis of the first most significant keyword digit has indicated that the digit is five or greater the M digit address would have been altered in accordance with information which was stored in the one of the Addressable Register 121 indicated by the BB digits of the keyword. Assuming now that the most significant digit in fact was a one, it becomes apparent from the earlier discussion that the right hand portion of the first M Word would be chosen as the address for the second level of indirect addressing. Therefore there would be no need to shift the M Word in the M Word Register (FIG. 7) because the right hand portion is automatically properly inserted as later explained.

Thereafter, the new address for the second level of indirect addressing is read from the five least significant positions of the M Word Register 193 and transmitted through gates 155, through the B-adder 139, once again through gates 140 to the Address Decoder 141 to extract a second M Word from the Memory 111. The new M Word extracted from Memory 111 is in turn transmitted to the Memory Read Register 150 and transmitted therefrom to the M Word Register 193 to provide an address for the third level of indirect addressing and enable a second choice as to whether the right-hand or the left-hand M portion will be chosen.

This pattern of operation continues until one of the keyword digits is analyzed as being 4 or 9. Thereafter an "indirect address end" signal (IA end) is generated which resets flip-flop 187 which in turn permits the II digits of the instruction word to be decoded and the system functions in accordance therewith. However, the operand which participates in this operation (controlled by the II digits) is that which was found by the multiple steps of indirect addressing as will be more fully explained.

An example of the utility of multiple level indirect addressing is provided hereinafter along with a detail explanation of certain of the components employed in the system.

Before describing in detail the circuitry and the timing diagram FIG. 4 consider an example of the use of the present indirect addressing scheme in conjunction with Table 1.

TABLE 1

| ADDRESS | CONTENTS | | ADDRESS | CONTENTS | |
|---|---|---|---|---|---|
| 10000 | 10002 | 02 | 10060 | 05 | 10062 |
| 10001 | 10014 | 02 | 10061 | 05 | 10102 |
| 10002 | 10004 | 03 | 10062 | 10064 | 06 |
| 10003 | 10026 | 03 | 10063 | 10066 | 06 |
| 10004 | 10006 | 04 | 10064 | K (000101) | |
| 10005 | 10036 | 04 | 10065 | K (100101) | |
| 10006 | 05 | 10008 | 10066 | K (010101) | |
| 10007 | 05 | 10044 | 10067 | K (110101) | |
| 10008 | 10010 | 06 | 10068 | 05 | 10070 |
| 10009 | 10012 | 06 | 10069 | 05 | 10108 |
| 10010 | K (000000) | | 10070 | 10072 | 06 |
| 10011 | K (100000) | | 10071 | 10074 | 06 |
| 10012 | K (010000) | | 10072 | K (000110) | |
| 10013 | K (110000) | | 10073 | K (100110) | |
| 10014 | 10016 | 03 | 10074 | K (010110) | |
| 10015 | 10050 | 03 | 10075 | K (110110) | |
| 10016 | 10018 | 04 | 10076 | 10078 | 06 |
| 10017 | 10060 | 04 | 10077 | 10080 | 06 |
| 10018 | 05 | 10020 | 10078 | K (001010) | |
| 10019 | 05 | 10026 | 10079 | K (101010) | |
| 10020 | 10022 | 06 | 10080 | K (011010) | |
| 10021 | 10024 | 06 | 10081 | K (111010) | |
| 10022 | K (000001) | | 10082 | 10084 | 06 |
| 10023 | K (100001) | | 10083 | 10086 | 06 |
| 10024 | K (010001) | | 10084 | K (001100) | |
| 10025 | K (110001) | | 10085 | K (101100) | |
| 10026 | 10028 | 04 | 10086 | K (011100) | |
| 10027 | 10068 | 04 | 10087 | K (111100) | |
| 10028 | 05 | 10030 | 10088 | 05 | 10090 |
| 10029 | 05 | 10076 | 10089 | 05 | 10114 |
| 10030 | 10032 | 06 | 10090 | 10092 | 06 |
| 10031 | 10034 | 06 | 10091 | 10094 | 06 |
| 10032 | K (000010) | | 10092 | K (001111) | |
| 10033 | K (100010) | | 10093 | K (101111) | |
| 10034 | K (010010) | | 10094 | K (011111) | |
| 10035 | K (110010) | | 10095 | K (110111) | |
| 10036 | 05 | 10038 | 10096 | 10098 | 06 |
| 10037 | 05 | 10082 | 10097 | 10100 | 06 |
| 10038 | 10040 | 06 | 10098 | K (001011) | |
| 10039 | 10042 | 06 | 10099 | K (101011) | |
| 10040 | K (000100) | | 10100 | K (011011) | |
| 10041 | K (100100) | | 10101 | K (111011) | |
| 10042 | K (010100) | | 10102 | 10104 | 06 |
| 10043 | K (110100) | | 10103 | 10106 | 06 |
| 10044 | 10046 | 05 | 10104 | K (001101) | |
| 10045 | 10048 | 06 | 10105 | K (101101) | |
| 10046 | K (001000) | | 10106 | K (011101) | |
| 10047 | K (101000) | | 10107 | K (111101) | |
| 10048 | K (011000) | | 10108 | 10110 | 06 |
| 10049 | K (111000) | | 10109 | 10112 | 06 |
| 10050 | 10052 | 05 | 10110 | K (001110) | |
| 10051 | 10088 | 04 | 10111 | K (101110) | |
| 10052 | 05 | 10054 | 10112 | K (011110) | |
| 10053 | 05 | 10036 | 10113 | K (111110) | |
| 10054 | 10056 | 06 | 10114 | 10116 | 06 |
| 10055 | 10058 | 06 | 10115 | 10118 | 06 |
| 10056 | K (000011) | | 10116 | K (001111) | |
| 10057 | K (100011) | | 10117 | K (101111) | |
| 10058 | K (010011) | | 10118 | K (011111) | |
| 10059 | K (110011) | | 10119 | K (111111) | |

In Table 1 there are two columns, the address column and the contents column. Each line in the address column represents the address location of information stored in the Memory and the information on each line in the contents column opposite an associated address represents the information stored thereat. Table 1 is a tabular description of the physical arrangement which the Memory 111 would assume if the presently described operation were to take place. In Table 1 where the right hand portion of the contents is not used, it is not filled in, and the same is true of the left hand portions which are not used.

Assume that the present system is going to be involved in an indirect addressing operation and the first keyword is composed of the key digits 50565. The first keyword is made up of the digits 50565 in order to illustrate many of the operations of the system as will become apparent. Other keyword combinations could be considered but Table 1 is arranged to be used with a first keyword 50565. To further illustrate the system operation, consider that there is a second keyword which will be extracted after the first keyword has been completely analyzed. While a second keyword can contain twelve digits it is only necessary in our example to consider the second keyword as having one digit, in its highest order position. The second keyword will be considered as having only the numeral 9 as its most significant digit so that we will only consider six levels of indirect addressing. The keyword digit 9 when analyzed as already mentioned, will indicate that indirect addressing should end. From the previous discussion it will be recalled that the most significant digit of the first keyword, which is a 5 and which is the first digit to be analyzed, indicates that the first address (M1 of FIG. 4) should be indexed or B-modified and that the left-hand portion of the M2 word (which is extracted from the Memory) should be chosen. The second keyword digit to be analyzed which is zero, indicates that the left-hand portion of the M3 word should be chosen and that the second word M2 should not be B-modified. The third keyword digit, which is a 5, indicates that there should be a B-modification of the third word, M3, and the left-hand portion of the M4 word should be selected. The fourth keyword digit which is 6, indicates that the word should be B-modified and that the right hand portion of M5 should be chosen. The fifth keyword digit, which is a 5, indicates that M5 word should be B-modified and that the left hand portion of the M6 word should be chosen. The most significant digit of the second keyword which is a 9, indicates that the indirect addressing should come to an end and that the last address (M6+BB) which is determined, is the address that the indirect addressing operation is seeking.

In order for the system operation to be clearly understood consider that the system is going to perform an information retrieval operation, in particular the system is going to attempt to retrieve information on published articles (e.g. patents, magazine write-ups etc.) related to an electronic circuit. Assume that the electronic circuit has six characteristics, one of which is fixed, and the other five of which may be either one of two characteristics. Knowing that these possibilities of characteristics exist certain of the addressable registers 121 (FIG. 1A) can be designated to define, in binary form, the particular circuit being sought by placing each single characteristic designation in an assigned addressable register. Since the present example limits the characteristics to one of two choices, the information in the addressable registers will either be a one or a zero. It should be understood that a table can be arranged to accommodate any one of many numbers in the addressable registers.

Although the significance of a characteristic is binary, the numbers one and zero will be in the proper code to accommodate the system. If the addressable registers 121 as described in the U.S. patent application "Computer Cycling and Control System," mentioned above, are employed, the binary value one and zero will be in the parployed, the binary values one and zero will be in the particular binary-decimal coded form used therewith. Other values zero and one, may be in straight binary form, or in the 1–2–4–8 weighted binary-decimal form. The only restriction on the addressable registers is that the characteristic value can be stored in the coded form which is compatible with the rest of the system.

The user of the system knows that somewhere in the memory there is stored information pertaining to the particular circuit that he has under conisderation, but he does not know exactly where this information is stored. The only knowledge the user has is what the circuit characteristics might be. To carry our example further assume that the first characteristic deals with whether the circuit is a transistor circuit or a tube type circuit. Assuming that a transistor circuit is being sought and that a binary one indicates "transistor characteristic," in the first addressable register a one will be placed (in the properly coded form) indicating that the circuit being sought is a transistor circuit. Obviously the arrangement could have been vice versa, i.e. a zero could have indicated a transistor circuit and the tube circuit might have been indicated by a binary one. It will be noted that the second keyword digit is a zero. Since zero indicates that no B-modification will take place, this will be fixed characteristic. Assume that the circuit being sought is an amplifier and this is a fixed characteristic that is, there is no choice between one of two characteristics. Since "amplifier" is fixed as the second characteristic, there is a zero placed in the second keyword digit and in the second addressable register. It should be noted that since the second keyword digit is zero (and there will be no B-modification) it really makes little difference whether or not a zero is placed in the second addressable register. Assume that the third characteristic deals with whether the circuit has a gain either greater or less than one. In the present example the circuit being sought has a gain greater than one and this is designated by a one in the third addressable register. Assume that the fourth characteristic deals with whether or not the amplifier has a feedback circuit. Consider that the amplifier being sought is a feedback amplifier and the "feedback" characteristic is designated by a zero in the fourth addressable register. Further assume that the fifth characteristic designates either a high frequency or a low frequency amplifier. Assume the search is for an amplifier which is a high frequency amplifier and that the designation for high frequency amplifier is zero. Hence, a zero is placed in the fifth addressable register. Finally assume that the binary one and that the research is for a low level amplifier transmits low level signals. Assume that an amplifier transmitting low level signals would be designated by a binary one and that the research is for a low level amplifier. Consequently their is a one in the sixth addressable register. It can now be seen that the information retrieval is for an electronic circuit which has the binary characteristic designation 100101. Table 1 operates for any set of six characteristics used with the keywords 50565 9———.

In order to find where in the Memory, information related to this particular amplifier might be located, an instruction, is keyed or inserted in the system and the first keyword is extracted from the Memory. The first keyword has the format 50565 01 10000. It will be recalled that the first five digits are the keyword digits, that the 01 are the BB digits; and the 10000 represents the address of the first M word. Since the highest order keyword digit 5 indicates that the first address should be B-modified by the contents of the first (BB) register (contents being 1) we find that the address information which is transmitted to the Memory is 10001 instead of 10000. The contents (from Table 1) of the memory address 10001 is 10014 02 ———. As was mentioned earlier in Table 1 the right hand portions of the address which are not used, are not filled in, and likewise the left hand portions of the addresses which are not used in the present example are not filled in. Hence, the contents of the address 10001 is 10014 02 ———.

Since the highest order keyword digit is 5 the left hand portion of the M2 address is to be chosen. Therefore the left hand portion of the contents of address 10001, which is 10014, is sufficient information and it is ready to be B-modified if necessary and transmitted to seek a third level address M3. Examining Table 1 at the address location 10014 we find that the contents thereof are 10016 03 ———. Since the second keyword digit is zero indicating that the 10014 address (M2) is not to be B-modified, the address 10014 is transmitted to the Memory and the contents thereof (10016 03 ———) are extracted. The left hand portion becomes the third address (M3) for effecting the third level of indirect addressing.

The third keyword digit is 5 and therefore when the address 10016 is transmitted to the Memory, it is B-modified by the contents of the third BB register. It will be recalled that the binary characteristics 100101 were placed in the respective first through sixth BB registers; therefore the M3 address, 10016, is modified by one from the third BB register and the address which is actually transmitted to the Memory is 10017. We find in Table 1 that the contents of address 10017 is the address 10060 04 ———, and since the third keyword was a 5 the left hand portion of the new address, or 10060, is the proper choice. The fourth keyword digit is a six which signifies a B-modification, but since the fourth binary characteristic is a zero, the address 10060 is B-modified by zeros. Since the fourth keyword digit is 6 indicating that the right hand portion of the contents of the address 10060 should be chosen, the M5 address 10062 is properly chosen. The fifth binary characteristic is zero, and hence the M5 address 10062 is transmitted unchanged (it being B-modified by zeros). Table 1 shows that the contents of address 10062 is the M6 address 10064. Since the fifth keyword digit is 5 the left hand portion of the contents (10064 06 ———) of the address 10062 is the proper address to be chosen.

The sixth binary characteristic is a 1 and the first keyword digit of the second keyword is a 9 which means (in addition to IA end) that when the address 10064 is transmitted to the memory it will be B-modified by 1 to become 10065. From Table 1 we find the contents of 10065 are K (100101). Therefore by going through the six levels of indirect addressing the system has found the memory location where there is "published" information pertaining to a transistor amplifier, having the characteristics of: gain greater than one; a feedback circuit; handling high frequency signals and transmitting low level signals. Information relating to this amplifier is found at the Memory location 10065.

Obviously the contents of the addressable or BB registers could contain numbers larger than zero or one and many levels of keywords might be used so that an information retrieval could be accomplished for an item (e.g. electronic circuit patents) having many more characteristics than the six characteristics discussed in the above simple example. Consider now in detail the circuitry and the timing diagram.

FIGURE 3 depicts the T digit portion of the IR-1 Instruction Register 111 as well as the Decoder 185. In addition, the circuit connections to the flip-flop 187 and to a portion of the initial signal circuitry are shown. The Ignore digit for purposes of illustration is 11000 and is inserted in the T position. The "set" output signals from flip-flop 311 and 313 along with the "reset" output signals from the flip-flops 315, 317 and 319 are transmitted to the gate 321 in Decoder 185. The gate 321 is rendered fully conductive and transmits an output signal therefrom to the gate 186. At this time a 312 function table signal is generated and is transmitted to the gate 186 to render this gate fully conductive which in turn transmits an output therefrom to transfer the flip-flop 187 to its set side. In this manner IAFF 187 is transferred to its set side and will be explained more fully hereinafter the flip-flop 187 controls many of the operations in an indirect addressing process.

When the flip-flop 187 is transferred to its set side the output therefrom is transmitted to the Instruction Decoder 109 to inhibit the activities of this Decoder. Normally Instruction Decoder 109 decodes the II digits of the instruction word and enables or directs the operation of the system in accordance with the decoded signal. Since there is an indirect addressing operation taking place the Instruction Decoder 109 is inhibited so that the information represented by the II digits will not be decoded. In effect the system will wait until the operand which is being sought by the indirect addressing operation is actually found before decoding the II digits.

Figure 4A:
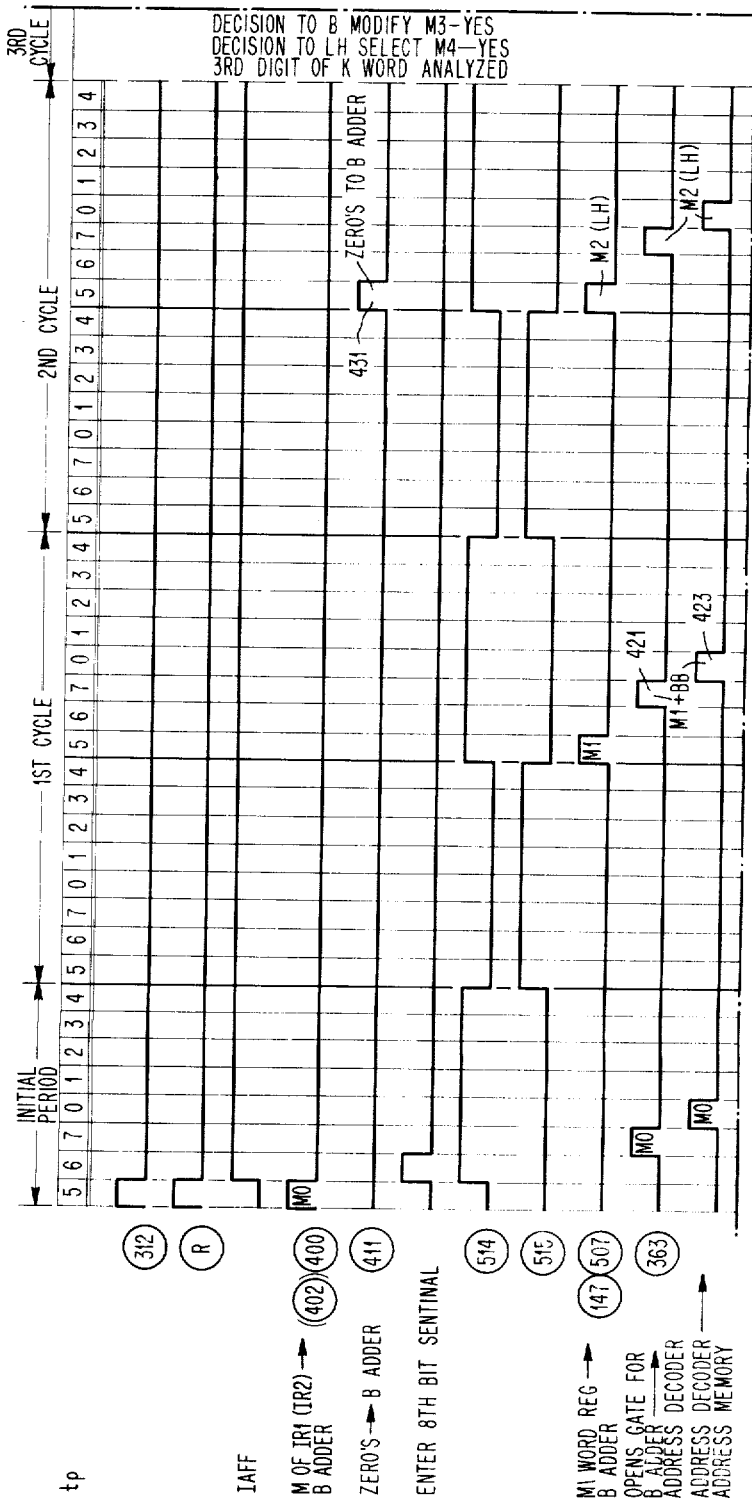
FIG. 4 (*a*, *b*, *c*, and *d*) is a timing diagram of the operation of system.
Figure 4B:
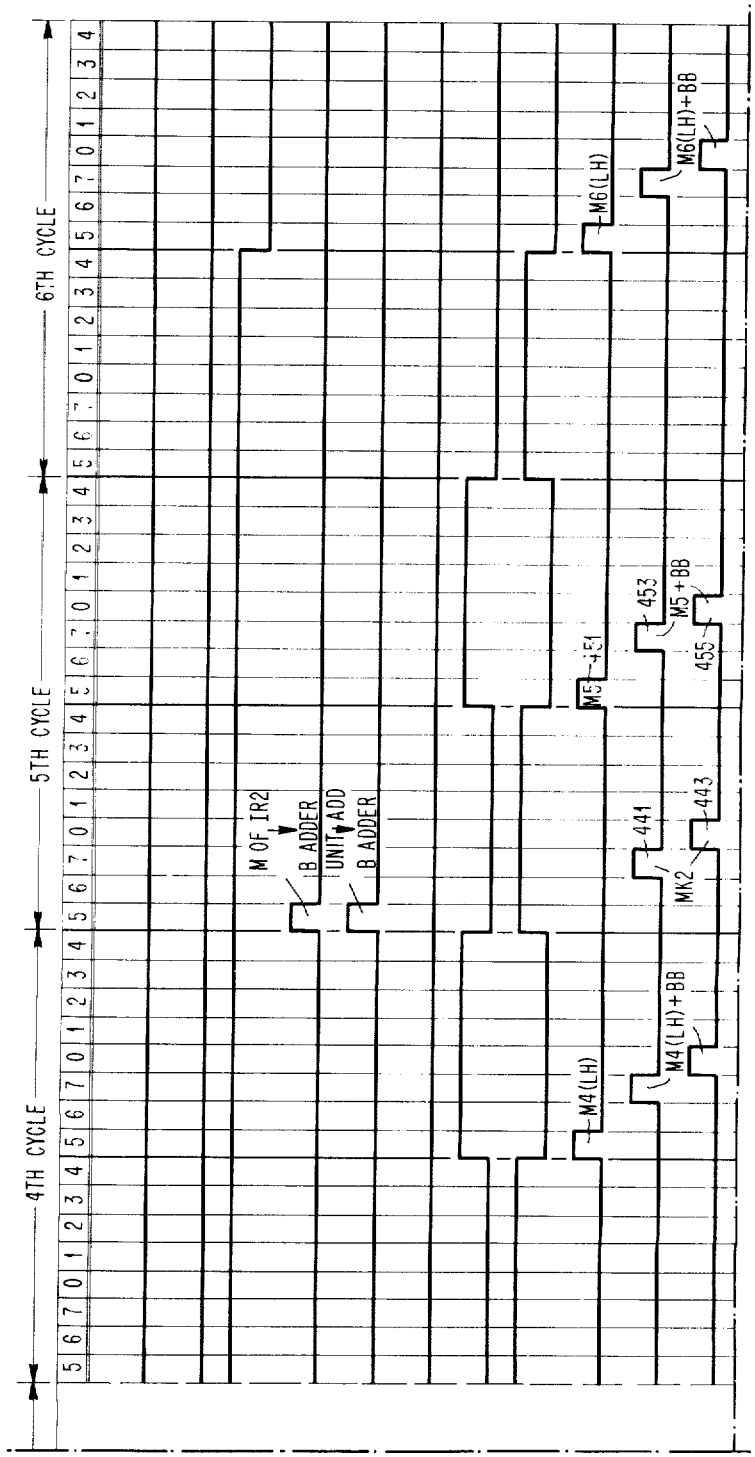

As was mentioned earlier all of the flip-flops throughout the system have a one pulse delay and therefore the output from the flip-flop 187 is one pulse time after the output from the gate 186. The function table signal 312 is generated at $tp5$ time (in accordance with the timing described in U. S. patent application "Computer Cycling and Control System," supra) and therefore the output from the flip-flop 187 takes place at $tp6$ time. As can be seen in FIGURE 4a the IAFF signal commences at $tp6$ time. During $tp5$ time the output from the gate 186 is transmitted to the gate 188 and the output therefrom provides the reset signal R. It can also be seen in FIGURE 4a that the reset signal R takes place at $tp5$ time.

Figure 8:
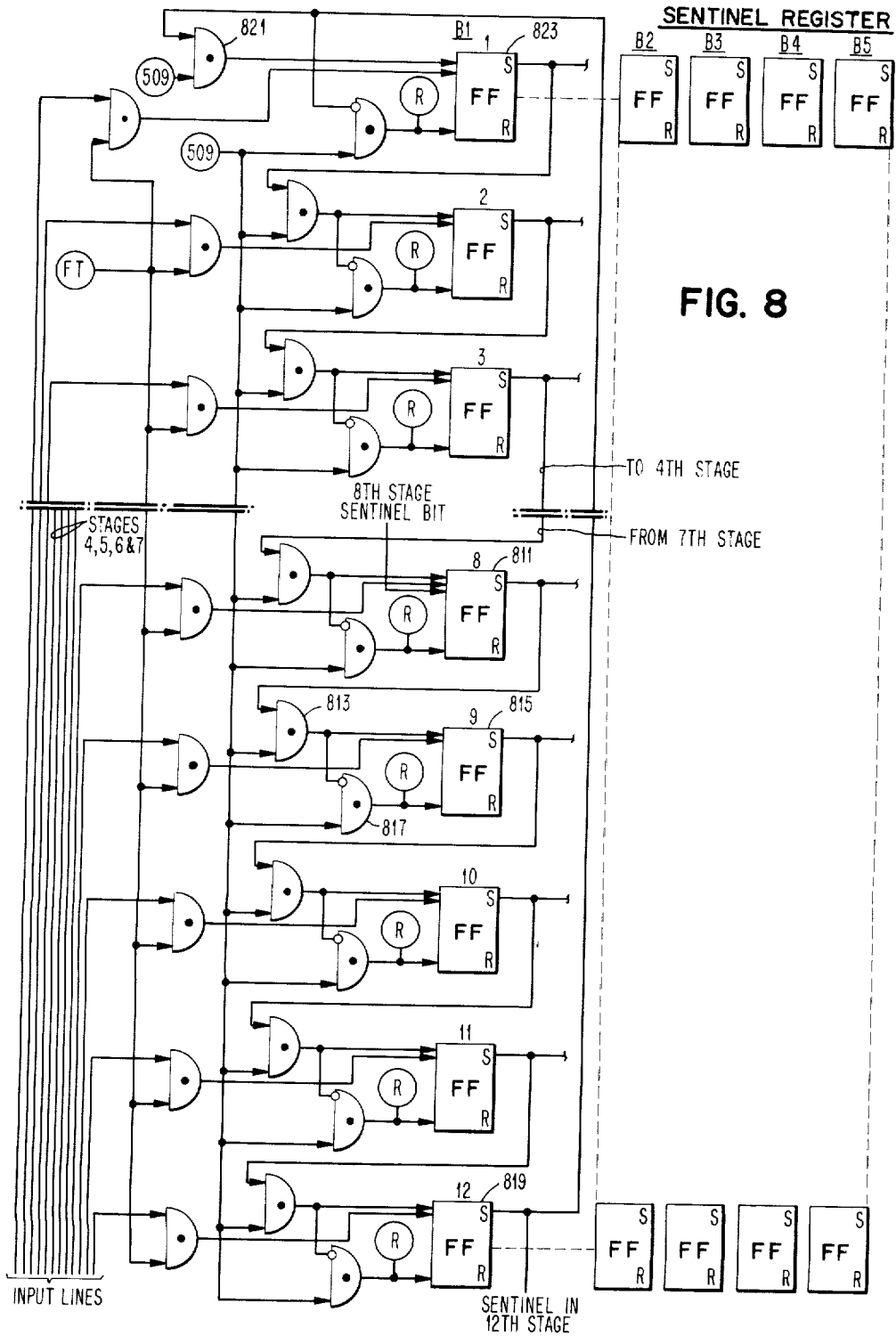
FIG. 8 is a schematic diagram of the Sentinel Register.

The output from gate 188 is transmitted to the three delay devices 323, 325, and 327. At the one pulse delay device 323, the R pulse is delayed for one pulse time to provide a one pulse signal at $tp6$ time, which becomes the eighth bit sentinel signal. As will become apparent when the sentinenl register is discussed, the first bit signal is placed in the eighth bit position so that it can be advanced to the twelfth bit position by four advancing pulses. The sentinel signal position enables the system to monitor or detect when a keyword has been fully analyzed as will be more fully explained. For the moment it suffices to understand that at $tp6$ time there is a bit signal placed in the eighth position of the Sentinel Register (FIG. 8). The R signal is also transmitted to the eleven pulse delay device 325 in order that an "initial K word signal" can be generated eleven pulse times after $tp5$ of the initial cycle. The necessity of the "initial K word signal" will become apparent when we consider in detail the timing diagram FIGURE 4. The signal from gate 188 is further transmitted to the seven pulse delay device 327 to provide a signal which will inhibit the first sentinel advance. Likewise the role of this inhibiting signal will become more apparent when we consider the timing diagram FIGURE 4 in detail. At $tp6$ time the output from IAFF 187 is transmitted to the gate 188 as an inhibiting signal so that thereafter there will be no signals provided on the reset line nor from the delay devices 323, 325, or 327 until another IA operation is commenced. As indicated in FIGURE 3 the output from IAFF 187 is transmitted to the function table signal matrix in order that function table signals as shown in FIGURE 2 can be generated at the proper time when there is an indirect addressing operation taking place.

In the lower right portion of FIGURE 3 there is shown a complementing flip-flop 329 (a one stage binary counter) which is reset to the "514 side" in response to reset signal R. Thereafter gate 331 is rendered fully conductive in response to an IAFF signal and a $tp4$ signal. Hence flip-flop 329 is transferred in complementary form with the arrival of each $tp4$ pulse and the output therefrom provides a different control signal for every other half cycle. The 515 control signal occurs during the first half of each cycle while the 514 control signal occurs during the second half of each cycle.

Figure 5:
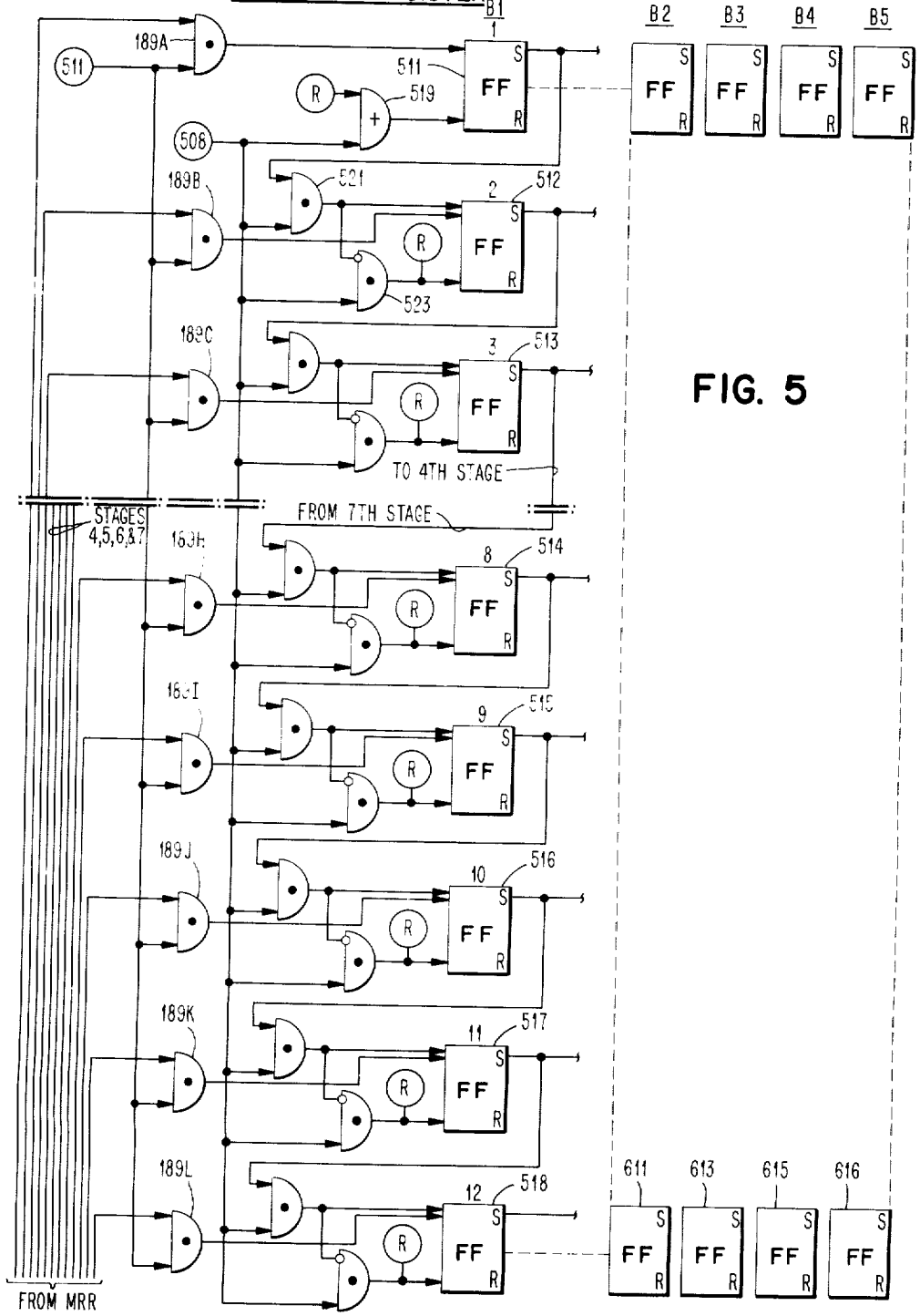
FIG. 5 is a schematic diagram of the Keyword Register.

Consider now FIGURE 5 which is a schematic block diagram of the Keyword Register 191. The output lines from the Memory Read Register 150 of FIGURE 1 are shown in FIGURE 5 as coming to the plurality of gates 189A through 189L. It is to be understood that since there are sixty flip-flops, or sixty storage elements, there are sixty gates similar to the 189 gates. Certain of the gates in the stages have not been shown in FIGURE 5 since they are repetitive and for simplicity the diagram of the register is shown breaking between the third stage and the eighth stage. However, it is to be understood that similar circuitry actually exists between the third stage and the eighth stage. It should also be understood that there are five bits in each digit and therefore a description of a single flip-flop of a digit is applicable to each flip-flop of the associated digit.

When information is transferred from the Memory Read Register 150 into the Keyword Register 191 the 511 function table signal is generated as shall be explained and is transmitted to each of the gates 189A through 189L. If there is a one-bit signal present on any of the lines coming from the Memory Read Register 150, the one-bit signal in conjunction with 511 function table signal renders its respective 189 gate conductive and the associated flip-flop is transferred to its set condition. As can be seen in FIGURE 5 reset signal R is applied to each of the flip-flops 511 through 518 and transfers them to their respective reset sides. The keyword is shifted in response to a 508 function table signal. For instance if a one bit is present in the first stage when the 508 signal is generated, the one bit signal is transmitted to gate 521. The output from the gate 521 is transmitted to the second stage to transfer the second stage to its set side, and simultaneously to the gate 523 to inhibit this latter gate thereby rendering the 508 F.T. signal applied thereto ineffective. Simultaneously the 508 function table signal is transmitted to buffer 519 to reset flip-flop 511. In this way each time a 508 F.T. signal is generated, information in the keyword register is shifted (five bits per stage) from the first stage, to the second stage, to the third stage, etc. A one bit signal present at any stage is shifted similarly. The output signals from the keyword register come from the 12th stage flip-flops 518, 611, 613, 615 and 616 as shown in FIGURE 6.

Figure 6:
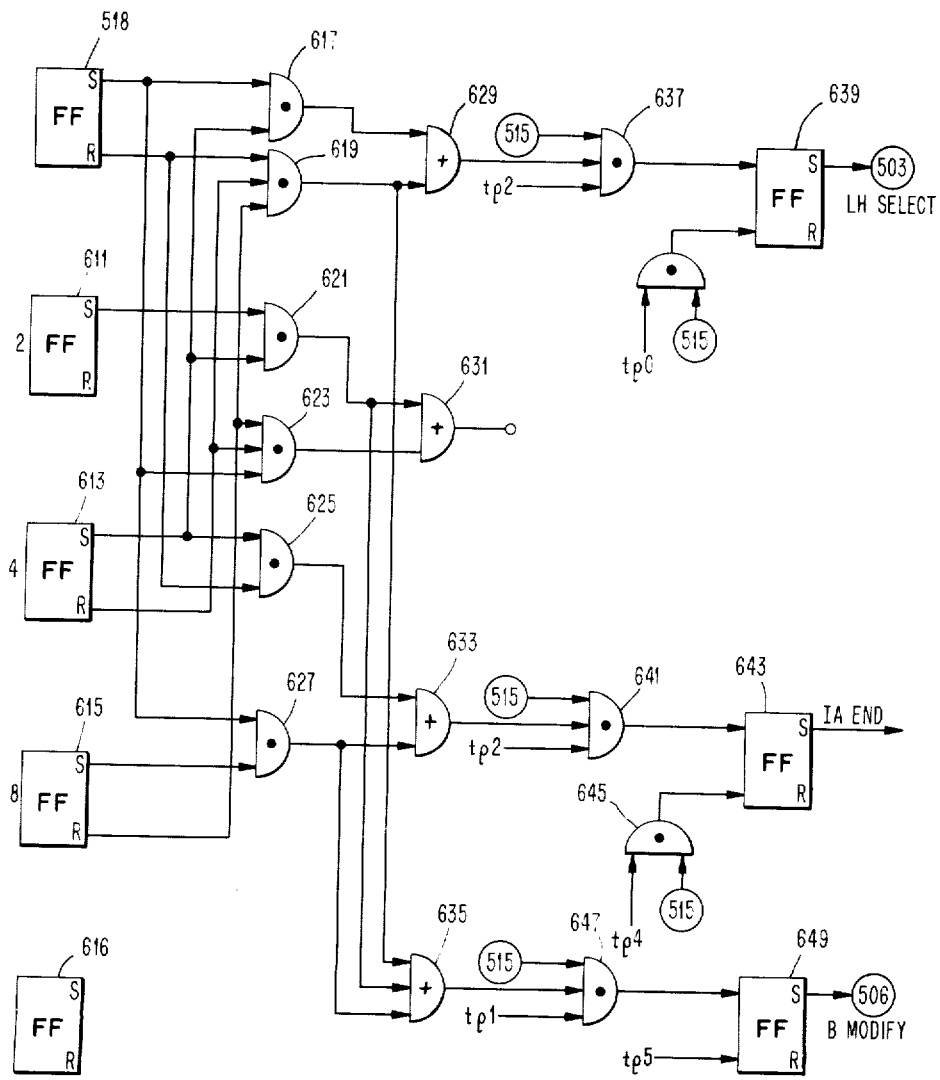
FIG. 6 is a schematic diagram of the Keyword Digit Decoder.

Consider FIGURE 6 which shows the Keyword Digit Decoder 192. It can be seen in FIGURE 6 that the twelfth stage flip-flops of the Keyboard Register 191 including the flip-flops 518, 611, 613 and 615 are shown. The outputs of the flip-flops 518, 611, 613 and 615 are transmitted to a plurality of gates 617, 619, 621, 623, 625, and 627. The output signals from the gates 617, 619, 621, 623, 625, and 627 just described are transmitted to four buffers 629, 631, 633, and 635.

In FIGURE 6 consider that the flip-flops 518, 611, 613 and 615 are respectively weighted 1, 2, 4, 8 from top to bottom in the figure. Bearing this weighing designation in mind and tracing the flip-flop output leads it can be seen that the gate 617 provides an output signal when there is a five in the first digit position and the gate 619 provides an output signal when there is a zero in the first digit position. It will be recalled that a five and a zero are the keyword digits which indicate that the left hand side of the M word is to be selected and hence the output signals from the gates 617 and 619 are transmitted to buffer 629. The output signal from buffer 629 is transmitted to gate 637 and therefore at tp2 time during the first half of the cycle (the 515 half of the cycle), if there is a five or a zero present in the first keyword digit the flip-flop 639 is transferred to its set condition to provide a 503 control signal. The 503 control signal indicates that the keyword digit analysis is such that the left-hand side of the M-word will be selected. The flip-flop 639 is reset during tp1 time of the "515 portion" of the cycle and the significance of this operation will become more apparent when we consider the timing diagram in detail.

The output from buffer 631, (which represents a keyword digit which is either a six or a one thereby designating the right portion is to be selected), is not used since the selection is made by transmitting the right-hand portion into the lower half of the M-Word Register. When there is a decision to choose the left-hand side, the information being transmitted from the Memory Read Register 150 is diverted from the upper portion of the M-Word Register into the lower as will become apparent when the M-Word Register is studied. However, the output means of the buffer 631 is provided for other uses which are not included in the present discussion.

The output means from gates 625 and 627 respectively represent a keyword digit of a four and a nine and it will be recalled that either a four or a nine indicates that an indirect addressing operation should come to an end (IA end). The output signals from gates 625 and 627 are transmitted through the buffer 633 to the gate 641. The gate 641 is further conditioned by a tp2 signal and a 515 signal. If gate 641 is fully conditioned the output signal therefrom transfers flip-flop 643 to its set side thereby providing an "IA end" signal which indicates that the indirect addressing should be terminated. The flip-flop 643 is reset by the output signal of gate 645 which is fully conditioned with a 514 control signal and a tp4 signal.

The input signals to the buffer 635 represent the output signals from the gates 617, 621 and 627, and it will be recalled that these gates represent the keyword digits 5, 6, and 9. The output from buffer 635 is transmitted to gate 647, which will become fully conditioned with the presence of a 515 control signal and a tp1 signal. The output signal from gate 647 transfers flip-flop 649 to its set side and thereby the 506 control signal is generated. The 506 control signal indicates that the address should be B-modified or indexed in accordance with the contents of the BB digits in the particular M-Word being processed. The flip-flop 649 is reset at tp5 time during each cycle.

Figure 7:
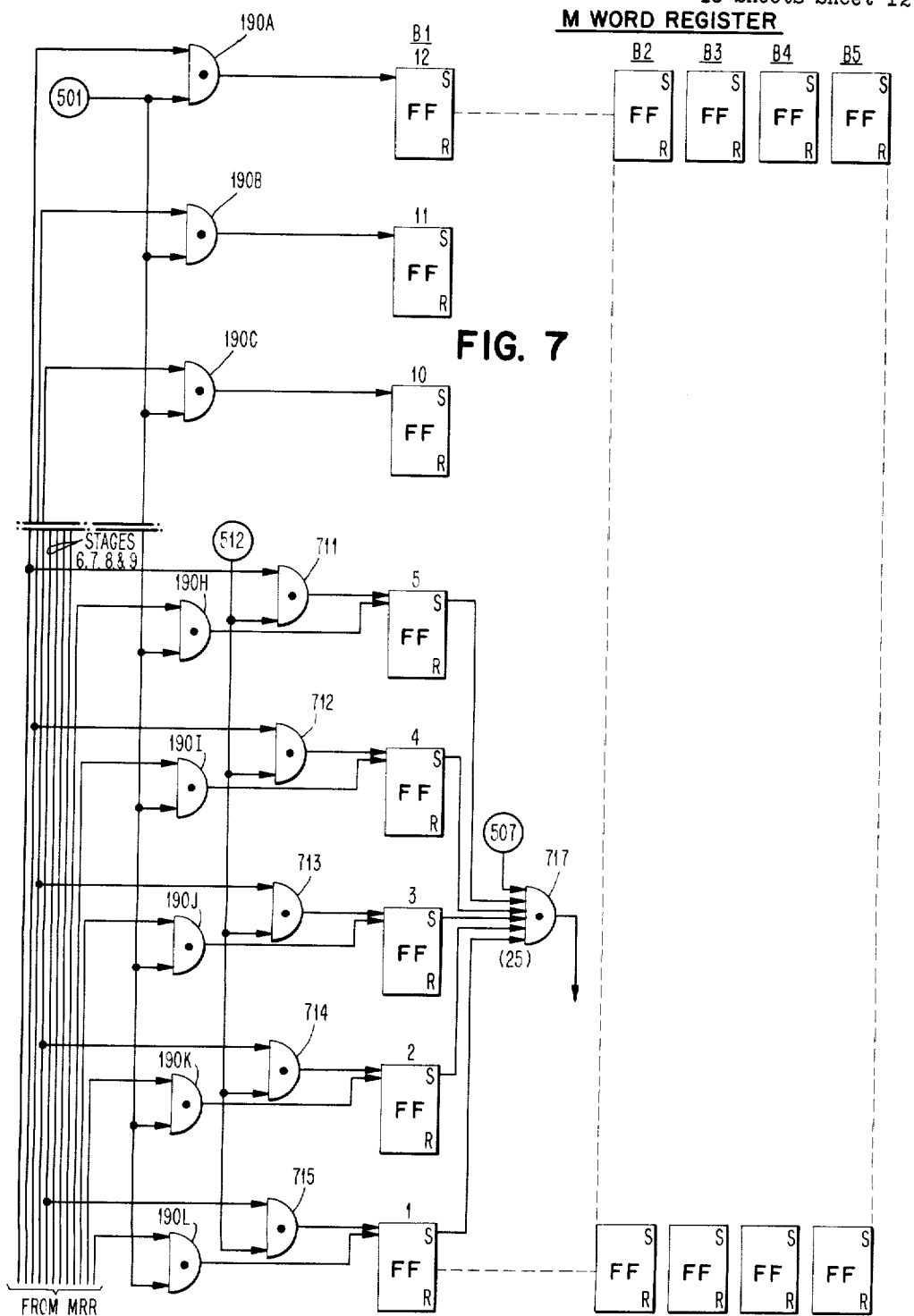
FIG. 7 is a schematic diagram of the M Word Register.

Consider now FIGURE 7 which is a schematic block diagram of the M-Word Register 193. While there are twelve stages (with each stage having five bits) in the M-Word Register, in FIGURE 7 there is a break between the third stage and the eighth stage in order to simplify the figure. It is to be understood that the stages 4 through 7, are identical to the stages which are shown and therefore operate in the manner to be described hereinafter. It will be noted that the stages 1 through 5 each have two input gates, one of the gates 190H through 190L and one one of the gates 711 through 715. Again it should be understood that for each bit position there is a gate similar to the 190 gates constituting sixty gates in all.

If there is information transmitted from the Memory Read Register 150 of FIGURE 1 to the M-Word Register 143 and there is no indication that the left hand portion of this M-Word should be selected, a 501 function table signal is generated and each of the gates 190A through 190L which has a one bit signal transmitted thereto will become fully conductive. The output signals of the conducting 190 gates are transmitted to their associated flip-flops thereby transferring these flip-flops to their respective set sides. Since there is no indication that the left hand side has been selected, the information which is normally in the right hand portion of the M-Word, or the five least significant positions of the M-Word, is transferred into the stages 1 through 5. The stages 1 through 5 have read-out leads from their respective set sides through the gates 717. Gates 717 are made responsive in accordance with the presence of a 507 function table signal.

However, if there is an indication that the left hand portion is to be selected, for instance, if there is a 503 control signal generated as was discussed in connection with FIGURE 6, a 512 function table signal will be generated as can be seen in FIGURE 2. The 512 function table signal is transmitted to the gates 711 through 715 and hence the information which would normally be transferred into the upper portion of the M-Word Register is transferred into the lower portion of the M-Word Register to provide a selection of the left-hand portion of the M-Word. In this way the stages 1 through 5 read the left hand portion of the M-Word. Insofar as the indirect addressing operation is concerned the M-Word Register needs only to consist of the stages 1 through 5, but since occasionally the M-Word Register is used to store the whole word the twelve stages are indicated in FIGURE 7. Again it should be kept in mind that each stage has five bits and therefore there are sixty storage elements in all. When a read out of the M-Word Register 193 is requested, the 507 function table signal is generated, as can be seen in FIGURE 2, and the gates 717 are rendered fully conditioned so that the bits of the respective digits of the M-Word Address can be transferred therethrough. Although it is not shown, it is to be understood that there is a gate for each of the 25 bits.

Consider now FIGURE 8 which is a schematic block diagram of the Sentinel Register which is included in the AU Control Circuits 130 (FIG. 1A). Although there is indicated for the Sentinel Register (FIG. 8) five bit positions for each digit, only the twelve flip-flops under the first bit position are really necessary for the present operation. The Sentinel Register is shown with five bit positions because the register is used in other operations for which the full twelve digit word is stored and wherein each digit has five bits.

It will be recalled that during the initial operation a bit signal was stored in the eighth position of the Sentinel Register. The input lead carrying this 8th sentinel bit is so labeled, and it is shown connected to the set side of flip-flop 811. The bit signal in the eighth position is stored in flip-flop 811 and is advanced by a 509 function table signal as is apparent from the circuitry. For example, if a 509 function table signal is generated and there is a one bit signal stored in flip-flop 811, the gate 813 is rendered fully conditioned to provide an input signal to transfer flip-flop 815. Simultaneously, the output from gate 813 is transmitted to gate 817 to impede the latter gate and thereby prevent the 509 function table signal from resetting 815. It will be recalled that as one of the ground rules for the system, mentioned earlier, a set pulse takes priority over a reset pulse. In this way the one bit signal from flip-flop 811 is transferred to the ninth stage or flip-flop 815. With the generation of each succeeding 509 signal the sentinel signal is advanced. Eventually the one bit signal is transferred to the twelfth stage or flip-flop 819. The output from flip-flop 819 is the signal which indicates "sentinel in twelfth stage" and as will become apparent hereinafter this signal plays a significant role in requesting an additional key word as will be discussed below. In particular, the output signal from flip-flop 819 indicates that if the particular keyword digit which is being analyzed at the time that the sentinel bit is in the twelfth stage does not indicate that indirect addressing should come to an end, a new keyword will be called for.

It will also be noted that the output of the twelfth stage is returned to gate 821 of the first stage of the sentinel register so that the one bit signal can be transferred or shifted from the twelfth position to the first position, or flip-flop 823, when a new keyword is called for.

To digress momentarily consider FIGURE 2 which depicts a means for the generation of many of the function table signals. Each vertical line represents an AND gate with actuating connections thereto (where the filled in dots appear) and inhibiting connections thereto (where the open circles appear). In other words considering the third vertical line which represents an AND gate to generate a 508 function table signal, it can be seen that the gate will be fully conditioned by an IAFF signal, a 514 function table signal and a tp3 signal, while it can be inhibited by a "sentinel in the 12th position" signal. The 501 function table signal (FIG. 2) is generated by the fifth gate (fifth vertical line) in response to an IAFF signal, a tp0 signal, and a 515 control signal, while it can be inhibited by an "indirect address end" signal (IA end)

as well as a 503 function table signal. Since during the first half of the first cycle neither the "IA end" signal nor the 503 control signal is present, the 501 function table signal will be generated. Looking at the sixth gate in FIGURE 2, it can be seen that the 511 function table signal is generated in response to the IAFF signal, a tp0 signal, and the "initial keyword" signal. It will be recalled that the "initial keyword" signal was generated, as shown in FIGURE 3, eleven pulse times after the reset signal R so that this provides for the initial entry of a keyword into the Keyword Register 191. The remainder of FIGURE 2 is self-explanatory and should be referred to in connection with the generation of function table signals.

Consider now the timing diagram FIG. 4 which is made up of the FIGURES 4a, 4b, 4c, and 4d, placed together as in FIGURE 4. The timing diagram of FIGURE 4 shows six full cycles plus an initial period. The third cycle has not been shown in detail in order to simplify the drawing and since it is repetitive.

In the initial period the function table signal 312 is generated at tp5 (in accordance with the system of U.S. application "Digital Computing System," mentioned earlier) and the reset signal R is generated at tp5 time. It will be recalled from the discussion of FIGURE 3 that the 312 function table signal in conjunction with a Ignore signal present in the T position of the IR–1 Instruction Register 101 renders gate 186 fully conditioned, to provide an output signal. Therefore, at tp5 time, the output from the gate 186 is transmitted to the flip-flop 187 to transfer flip-flop 187 to its set side thus providing the IAFF signal, starting at tp6 time as shown in the initial period of FIGURE 4. Simultaneously, at tp5 time, a signal is transmitted to gate 188 which renders the gate 188 fully conductive to provide the reset signal R at tp5 time as shown in FIGURE 4a and FIGURE 3.

In FIGURE 4a, in the initial period it can be seen that the IAFF signal starts at tp6 time which is one pulse time later than the 312 function table signal (at tp5 time) which transferred the flip-flop 187 to its set side. It will be recalled that as part of the operating ground rules, it was decided that a flip-flop has a one pulse delay and therefore an output signal is provided which is one pulse time later than an input signal applied thereto.

Also in FIGURE 4 in the initial period it can be seen that the 400 and 410 function table signals are generated at tp5 time. It can be seen from FIGURE 2 that the generation of the 400 and 410 function table signals in the initial period at tp5 time is in response to the reset signal R and the tp5 signal. The 400 function table signal serves to enable the information from the IR–1 Instruction Register 101 to be transferred through gates 136 into the B-Adder as shown in FIGURE 1B. The 410 function table signal enables the contents of a selected addressable register to be added to the M' address thereby modifying the latter.

Assuming there are zeros in the selected addressable register, zeros are added to the B-Adder through gate 133 as shown in FIGURE 1B. In this way, the M' digits, which make up the first address information which will be sent to the Memory 111 to extract the keyword, are transferred into the B-Adder with zeros. The "modified" M' digits are transferred from the B-Adder in their original form through gates 140, through the Address Decoder 141, to the Memory 111 in order to extract the first keyword.

Again looking at the initial period in FIGURE 4, it can be seen that at tp6 time the sentinel bit is entered into the eighth position of the Sentinel Register. It will be recalled that the sentinel bit is employed to monitor the advancement or the analysis of the keyword digits. Simultaneously, at tp6 time of the initial period, the 514 control signal is generated in response to the R signal. Thereafter the system has a different clock signal, either 514, or 515, on every half cycle. The cycles of FIGURE 4 have been depicted as divided into halves with eight *tp* timing pulses for each half. This designation is for convenience of explanation and differs from the cycle designation in the "Digital Computing System" application, mentioned earlier, wherein each cycle of eight *tp* timing pulses is called a minor cycle.

At *tp*7 time in the initial period 363 function table signal is generated in response to the set output of the IAFF, the *tp*7 timing signal, and the 514 function table signal. The 363 signal is in turn transmitted to gates 140 to permit the information in the B-Adder to be transferred through gates 140. It will be recalled that the M' address is in the B-Adder at *tp*5 time and is delayed two pulse times after which it is transferred therefrom. The 363 function table signal permits the transfer of information, in this particular case, the M' address, from the B-Adder to gates 140. The Address Decoder 141 is a plurality of gates and there is a one pulse delay time therein so that the M' address is transferred from the Address Decoder 141 at *tp*0 time.

As can be found in detail in the description of the system described in the U.S. patent application entitled "Computer Cycling and Control System," mentioned above, the Memory has a seven pulse delay time or latency time. In other words, seven pulses after the Memory is addressed, the information is extracted therefrom. Therefore, the M' address which has been identified in FIG. 4 as M0 is transmitted to the Memory at *tp*0 time of the initial period, and the contents of that address are extracted at *tp*7 time of the first half of the first cycle. The contents of the M0 address have been designated as the M1 and these contents are the first keyword.

Examining FIGURE 2 momentarily it can be seen that 370 function table signal is generated in response to the IAFF signal, a *tp*7 signal and a 515 control signal. The 515 control signal is generated at *tp*5 time during the first half of each cycle by the application of a *tp*4 pulse to gate 331 (FIG. 3). Hence during the first half of each cycle, at *tp*7 time, as long as the indirect addressing flip-flop is turned on, a 370 function table signal will be generated and the contents of the Memory previously addressed, will be extracted.

Examining FIGURE 1a, it is evident that the 370 function table signal is transmitted to gate 146 thus enabling information to be transferred from the Memory 111 into the Memory Read Register 150 at *tp*7. At *tp*0 time of the first half of the first cycle (FIG. 4c), the 501 function table signal is generated which permits the M1 word, which is the keyword, to be transferred from the Memory Read Register 150 into the M-Word Register 193. It can be seen in FIGURE 1a that the 501 function table signal is transmitted to gates 190 enabling information to be transmitted into the M-Word Register 193. At the same time during the first half of the first cycle (FIG. 4c), the M1 word which is the first keyword is also transferred into the Keyword Register 191, and in order to accomplish this a 511 function table signal is generated, also at *tp*0 time in response to the initial K word signal from element 325 (FIG. 3).

Also in the first half of the first cycle the 148 function table signal is generated (seventh gate in FIGURE 2) in order that the BB digits of the incoming word (in this particular case the BB digits of the first keyword), can be transmitted to select an addressable or BB register. The contents of this selected BB register may modify this "incoming word" when it is later transmitted to address the memory. It can be seen in FIGURE 1b that the gate 161 becomes fully conditioned in response to a 148 function table signal and an information signal from the Memory Read Register 150. The output of the gate 161 goes to the Register Selector 118 to select an Addressable Register 121 the contents of which will be used to modify or index the next address transmitted to the memory, if the first keyword digit is so analyzed.

It will be recalled from the information retrieval example of indirect addressing, supra, that the first keyword digit was 5 which indicates that the address should be B-modified (the 506 control signal is generated, see FIG. 6) and also indicates that the left-hand portion of M2 should be chosen (the 503 control signal is generated see FIG. 6). It will be noted that in FIGURES 4, *c+d* there is a legend associated with each half-cycle of operation indicating what is accomplished during the particular half cycle and what decisions are made with respect to B-modification and left hand portion (LH) select.

In the first cycle the 506 control signal (at 415) continues from *tp*2 until *tp*6 of the second half of the first cycle and at *tp*5 time of the second half of the first cycle the address M1 is actually indexed or B-modified. This B-modification takes place with the generation of a 410 function table signal (within the 506 control signal time, FIG. 4c) and as can be seen in FIGURE 2, the 410 function table signal is generated in response to an IAFF signal, a *tp*5 signal, a 514 control signal and a 506 control signal. It will be recalled that when FIGURE 6 was discussed, it was learned that a 506 control signal was generated at the output of flip-flop 649 and this output was made possible in response to the keyword digit being analyzed as a 5, 6, or 9. Since the first keyword digit is 5, the flip-flop 649 is transferred to its set side thus generating the 506 control signal which in turn helps generate the 410 function table signal at *tp*5 time. From FIGURE 1b it can be seen that the 410 function table signal is transmitted to the gate 133 to enable the output signals of the selected Addressable Register 121 to be transferred into the B-Adder. The contents of the selected addressable registers are added to an M address, in the first case to the M1 address, (i.e. the 5 M digits of the first keyword KKKKKBBMMMMM), to modify or index the M address.

Figure 4C:
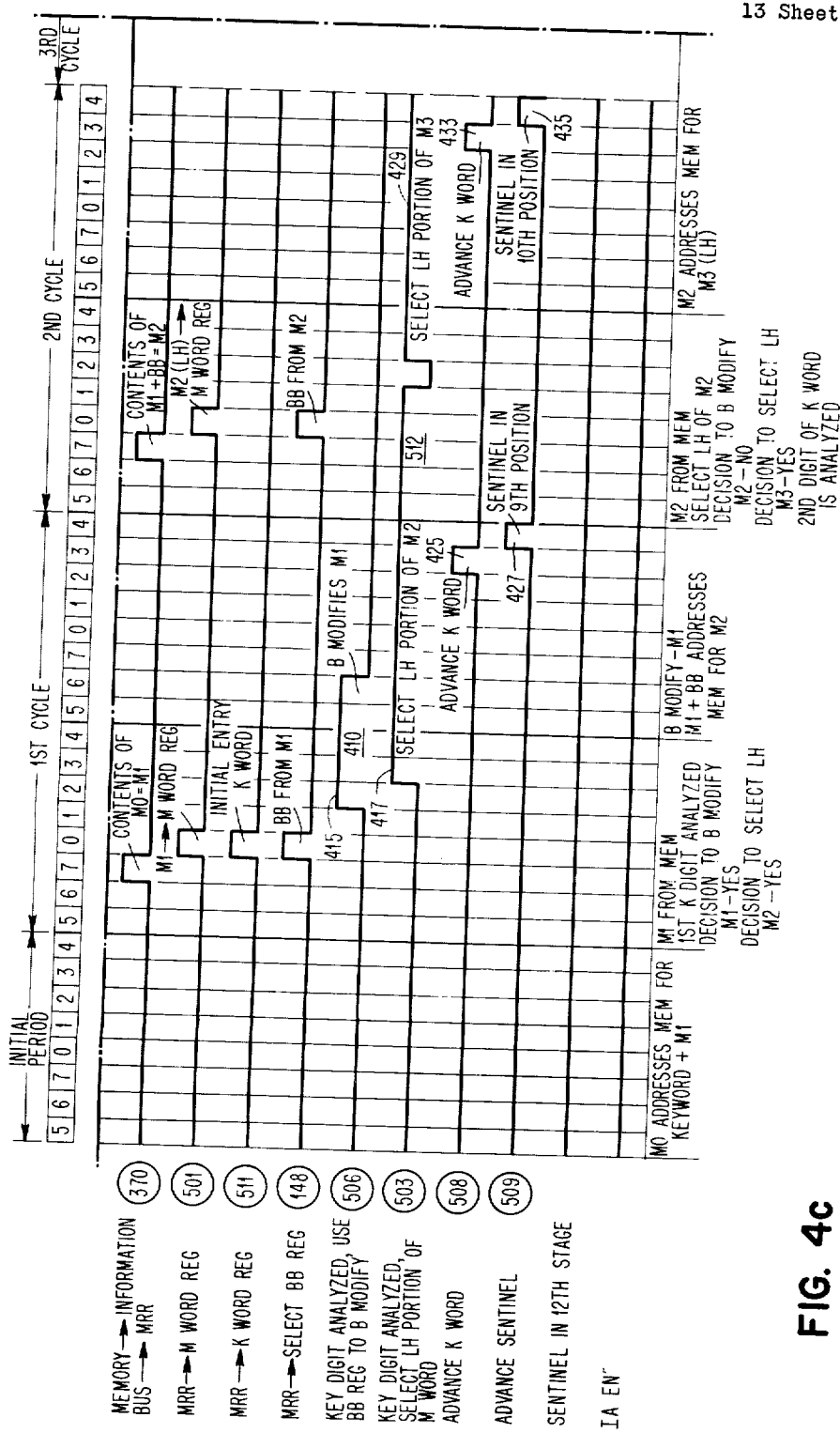

At *tp*3 time of the first half of the first cycle the 503 control signal in FIGURE 4c which indicates that the left-hand portion of M2 has been selected, is commenced and it continues through the entire second half of the first cycle and through *tp*1 time of the first half of the second cycle. The 53 control signal, it will be recalled, is generated as the output of the flip-flop 639 in FIGURE 6. The flip-flop 639 is transferred to its set side in response to the keyword digit being analyzed as either a zero or a five. The 503 control signal serves to help generate the 512 function table signal as can be seen in FIGURE 2. In FIGURE 2 it is apparent that the 512 fuction table signal is generated in response to IAFF, a *tp*0 signal, and the 503 control signal. It will be recalled that the 512 function table signal is transmitted to each of the gates 711 to 715 in FIGURE 7 to enable the information signals which normally would be transmitted to the five high order stages of the M-Word Register 193 to be transferred to the five low order stages thereof or to the stages one through five. In this manner the left hand portion of the M-Word is selected and transferred into the read-out positions of the M-Word Register 193. In our example the first keyword digit is a 5 and therefore the left-hand portion of M2 is selected and transferred into the stages one through five of the M-Word Register 193, as shown in FIGURE 7.

Figure 4D:
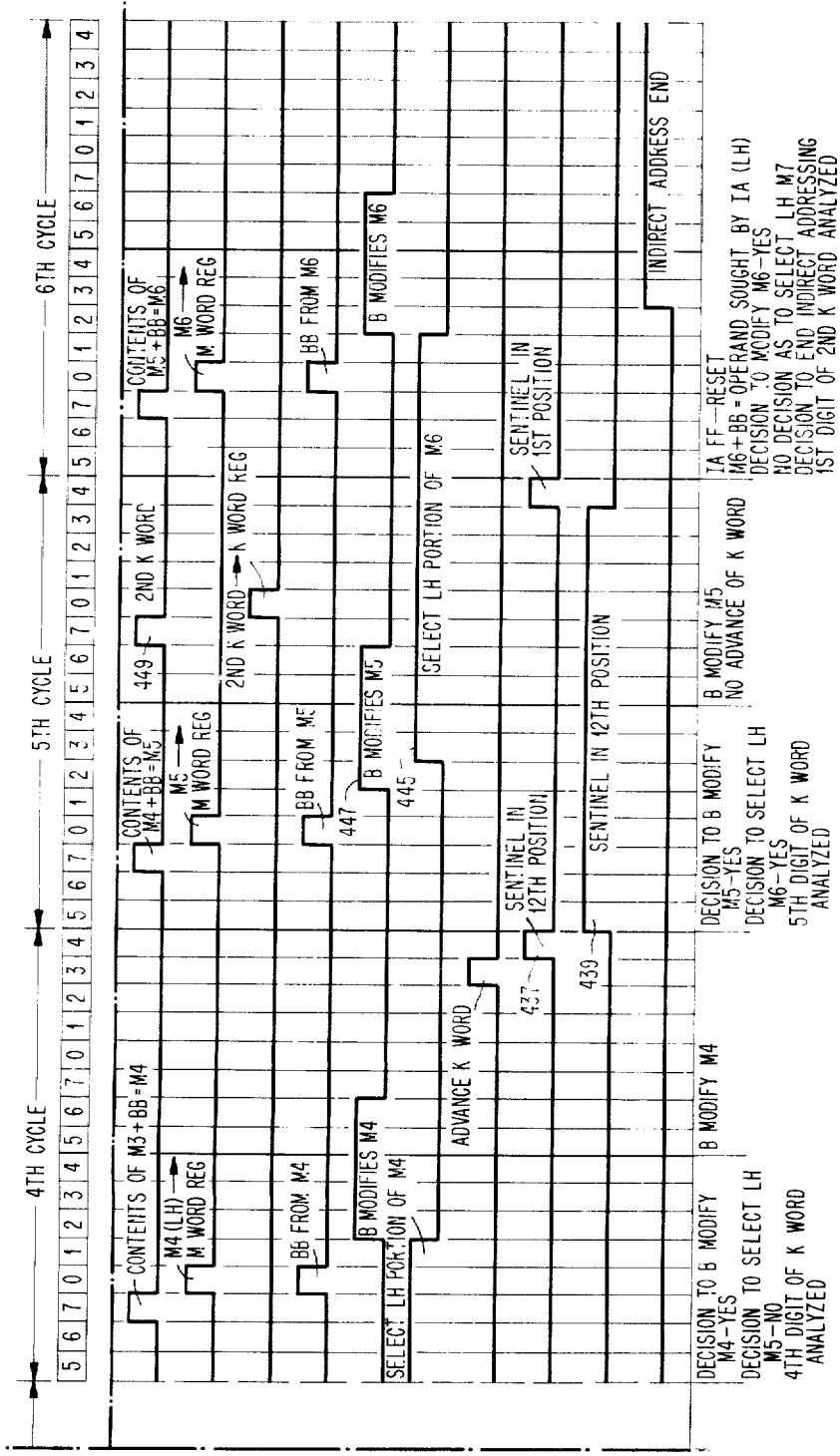

Examine now in particular the second half of the first cycle whereat at *tp*5 time the 507 and 147 function table signals are generated (FIG. 4d). These last-mentioned function table signals permit the M digits of the first Keyword (M1) from the M-Word Register 193 to be transferred into the B-Adder 139. In FIGURE 7 it is evident that the 507 function table signal renders the gates 717 conductive thus transferring information through gates 717 to the gates 155. Since the 147 function table signal is also generated at this time the gates 155 are rendered conductive to transfer the M-Word into the B-Adder 139. If the M1 address is to be indexed, the 410 function table signal will also be generated as has been discussed and therefore the address which is transmitted from the B-Adder is M1+BB. In our example, supra, it is 10000 (M1)+1 (BB) which equals 10001.

The M1+BB address is shown in FIG. 4 by the pulse 421 leaving the B-Adder 129 at *tp*7 time to pass through the Address Decoder 141 at *tp*0 time to the Memory 111. The pulse indicating that the information is leaving the Address Decoder 141 is shown as pulse 423 in the second half of the first cycle.

As was mentioned earlier there is a seven pulse latency time which permits the contents of the address M1+BB to be extracted from the Memory at *tp*7 time of the first half of the second cylce. The new contents of the address M1+BB is the new M word which is designated as M2.

During the latency time of the Memory between the second half of the first cycle and the first half of the second cycle the keyword is advanced as shown by the generation of the 508 function table signal (the pulse 425). Referring to the Keyword Register 191 shown in detail in FIGURE 5 it will be recalled that the 508 function table signal is the signal which advances or shifts the Keyword Register.

Also as shown in FIGURE 4 at *tp*4 time of the second half of the first cycle, the sentinel bit is advanced by the application of a 509 function table signal. The pulse 427 in FIGURE 4 indicates that the sentinel bit has been shifted from the eighth to the ninth position.

Examine now the first half of the second cycle of FIGURE 4. As has already been indicated at *tp*7 time of the first half of the second cycle the contents of M1+BB are extracted from the Memory and identified as M2. Specifically the pulse 429 (FIG. 4*a*) signifies this operation. Studying the legend on FIGURE 4*c* (see lower portion of figure) we find that during the first half of the second cycle the decision to B-modify M2 is negative and the decision to left hand select the left hand portion of word M3 is positive. It will be recalled that in the above example of the information retrieval the second characteristics was fixed, and hence the second keyword digit was zero indicating that there would be no B-modification. However, the keyword digit zero indicates that a selection of the left-hand portion of M3 is required.

Because the decision was made to not B-modify the second address (M2), the first half of the second cycle will be different from the first half of the first cycle in that the 506 function table signal will not be generated. However, the signal at 429 as shown in FIGURE 4 is generated during *tp*3 time of the first half of the second cycle and this indicates that the left-hand portion of M3 will be chosen.

During the second half of the second cycle at *tp*5 time, it can be noted, in FIGURE 4 by pulse 431, that zeros are added to the B-Adder. The zeros are added because the M2 address is not to be B-modified. During *tp*5 time of the second half of the second cycle the left-hand portion of M2 is transmitted to the B-Adder and at *tp*7 time is transmitted to the Address Decoder 141. From the Address Decoder 141 at *tp*0 time, the M2 address signals are transmitted to the Memory for the purpose of extracting the contents of the M2 address location. It will also be noted that at *tp*3 time of the second half of the second cycle, the Keyword is advance and the sentinel bit is advanced to the tenth position, as shown by the respective pulses 433 and 435.

The third cycle has been omitted for purposes of simplifying the drawing. During this 3rd cycle time the 3rd digit of the keyword is analyzed some of the effects of this analysis take place in the fourth cycle. Since the third keyword digit in the example was 5, we find that there has been a positive decision to B-modify and a positive decision to left-hand select.

The contents of the Memory location M3+BB are extracted from the Memory 111 at *tp*7 time of the first half of the fourth cycle and these contents are designated as M4. As M4 is transferred to the M-Word Register 193 the left-hand portion is selected at *tp*0 time in accordance with the decision made during the third cycle. Also, in the first half of the fourth cycle at *tp*0 time, one of the addressable registers 121 is selected, and the 4th keyword digit analysis indicates whether or not it will be used. During the first half of the fourth cycle since the 4th keyword digit is a 6 there is a positive decision to B-modify M4 and there is a negative decision to left-hand select. In other words, the right-hand portion of M5 will be selected and not the left hand portion.

During the second half of the fourth cycle the address M4 is transmitted to the B-Adder 139 at *tp*5 time; from the B-Adder to the Address Decoder 141 at *tp*7 time; and from the Address Decoder at *tp*0 time. Also during the second half of the fourth cycle, the keyword is advanced and the sentinel bit is advanced to the twelfth position, as shown by the pulse at 437. It will be recalled from the foregoing discussion that when the sentinel bit is in the twelfth position and the keyword digit analysis does not indicate that the indirect addressing should end, a second keyword is extracted from the Memory 111 and brought into the Keyword Register 191. It will further be recalled that the fifth digit of the first keyword in the example was a 5 which does not signify the end of indirect addressing (keyword digits 4 and 9 signify IA end). Therefore, in the fifth cycle the second keyword is requested or the extraction of the second keyword is initiated.

At *tp*5 time of the fifth cycle, the "sentinel in twelfth position" signal is generated as shown by the gate signal at 439 in FIGURE 4*d*. When the "sentinel in twelfth position" signal is generated, it in turn controls certain function table signals as can be seen from FIGURE 2. From FIGURE 2 it becomes evident that the "sentinel in twelfth position" signal serves to help generate the 402 function table signal and the UA, or units-add, function table signal from the tenth gate or the tenth line, at *tp*5 time. In accordance with the generation of the 402 function table signal and the UA function table signal, the M' address is transferred from the M' portion of IR-2 Instruction Register 108 to the B-Adder and there is a one added to the M' address in the B-Adder. It will be recalled that the M' address originally came from the Instruction Word and was the address from whence the first Keyword was extracted. The address which is transmitted from the B-Adder is M'+1 and this extracts the second keyword (comprising twelve K digits) from the Memory 111 as will be discussed hereinafter. The M'+1 address is returned to the IR-2 Register 108 via the gate 143 in response to a 311 function table signal. The M'+1 which is designated as MK2 is transmitted from the B-Adder at *tp*7 time of the first half of the fifth cycle as indicated by the pulse at 441 and is transmitted from the Address Decoder 141 at *tp*0 time as indicated by the pulse at 443. It will also be noted that at *tp*7 time of the first half of the fifth cycle, the contents M4+BB which are designated M5 are extracted from the Memory and transmitted to the M-Word Register 193 at *tp*0 time.

The system continues to handle the M5 adeess as though the MK2-word interim transaction was not going on for selecting the second keyword. Therefore, at *tp*2 time of the first half of the fifth cycle the B-modify signal 506 is generated in accordance with the decision to B-modify the M5 word and also the left-hand select signal 503 is generated at *tp*3 time of the first half of the fifth cycle. The B-modify signal at 447 and the left-hand select signal at 445 are generated as though the second keywords were not being brought from the Memory during the second half of the fifth cycle. Because of the latency of seven pulses from the time the Memory 111 is addressed, the second keyword is transmitted from the Memory at *tp*7 time of the second half of the fifth cycle as indicated by the pulse at 449. However, prior to *tp*7 time of the second half of the fifth cycle, M5 is brought from the M-Word Register 193 to the B-adder 139 as signified by the pulse at 451. M5 is B-modified (in the example 10062 (M5)+0(BB)=10062) and transmitted from the B–Adder to the Address Decoder 191 at *tp*7 time as signified by the pulse at 453. Finally M5 is brought from the Address Decoder at *tp*0 time which is indicated by the pulse at 455. However the pulse at 449 which indicates that the second keyword is extracted from the Memory occurred at *tp*7 time i.e. one pulse time before the Memory was engaged again or addressed by M5+BB as shown by the comparison between the pulses at 449 and 455.

At *tp*0 time of the second half of the fifth cycle it can be seen that the keyword is transmitted into the Keyword Register in response to the generation of a 511 function table signal. From FIGURE 2 it is evident that the 511 function table signal from the twelfth gate (twelfth line) which is labeled "enter second Keyword" is generated in response to an IAFF signal, a *tp*0 signal, a 514 signal, and the "sentinel in twelfth position" signal. This enables the second keyword to enter the Keyword Register 191. The 511 function table signal is also generated at the sixth gate (see FIG. 2) but not at the time to permit the second keyword to enter the Keyword Register.

Since the second keyword is in the Keyword Register 191 during the second half of the fifth cycle it is not necessary to advance the keyword. The first (most significant) keyword digit of the second keyword is in effect the sixth keyword digit or from the example the numeral 9. However, the numeral 9 is in the proper position when the second keyword is read into the Keyword Register, therefore the "advance keyword" pulse is not generated. The "advance keyword" digit signal is inhibited by the impeding effect of the "sentinel in twelfth position" signal (see FIGURE 2). In order for the keyword register to be shifted a 508 function table signal is generated and as can be seen in FIGURE 2 the "sentinel in twelfth position" signal acts to inhibit the generation of the 508 function table signal. The sentinel bit is advanced to *tp*4 time of the second half of the fifth cycle in normal fashion since circuitry is provided to place the sentinel bit in the first position of the Sentinel Register as it is advanced from the twelfth position.

During the sixth cycle, the sixth keyword digit (i.e. the first keyword digit of the second keyword) is analyzed and since it is a nine there is an indication that the indirect addressing operation will end.

It will be noted in the first half of the six cycle at *tp*7 time, the contents of M5+BB which is designated as M6 are extracted from the Memory and transferred into the M-Word Register. At *tp*3 time of the first half of the sixth cycle, the "IA end" signal is generated. It will be recalled from the discussion of FIGURE 6 that the "IA end" signal is generated as the output of the flip-flop 643. The flip-flop 643 is transferred to its set side in response to the keyword digit being analyzed as either four or nine. In the above example the sixth keyword digit or the first keyword digit of the second keyword is a 9 and therefore the "IA end" signal is generated at *tp*3 time of the first half of the sixth cycle. Since the sixth keyword digit is a nine, it means that there is a decision to B-modify the M6 address. No decision is made to lefthand or right-hand select because this decision is only made when the keyword is one of the digits: zero, one, five or six. Hence, in the last half of the sixth cycle at *tp*5 time, the M6 address is transferred to the B-Adder wherein it is B-modified by the contents of the addressable register selected by the BB digits of M6. M6+BB (in the example 10064 (M6)+1 (BB)=10065) is transferred from the B-Adder to the Address Decoder 141 at *tp*0 time. The contents of M6+BB address (10065 in the example) is the operand which the indirect addressing operation endeavored to find and in the example above it was information about an electronic circuit having the characteristic 101011.

Although only six cycles were shown and only six keyword digits were used in this particular indirect addressing operation it is to be clearly understood that the whole second keyword could have been filled with digits and analyzed, and other keywords could have been used to provide many, many levels of indirect addressing. It should also be understood that although in the keyword the most significant digit was analyzed first the least significant digit could be analyzed first.

While we have described above the principles of our invention in connection with specific apparatus, it is to be clearly understood that this description is made only by way of example, and not as a limitation of the scope of our invention as set forth in the objects thereof, and in the accompanying claims.

What is claimed is:

1. An indirect addressing device comprising: a multiple address storage means wherein information relating to at least two addresses can be stored; control circuitry means coupled to said multiple address storage means to make a selection of one of said addresses and to selectively terminate said selection process; keyword storage means to store a keyword having a plurality of digits, the interpretation of each of said keyword digits respectively determining a different selection of said one of said addresses and eventually said termination of said selection process; interpreting means coupled between said keyword storage means and said control circuitry to interpret each of said keyword digits and in response to each interpretation enable said control means to make a different selection of one of said addresses from at least two of said addresses and finally to enable said control means to terminate said selection process in response to a keyword digit interpretation indicating termination.

2. An indirect addressing system to be used with a data processing system having a data storage memory with a plurality of addressable locations therein comprising: an address storage means wherein an address of at least one of at least two of said memory locations is stored, said address storage means coupled to said memory; said address storage means adapted to simultaneously receive at least two memory adresses as a single word; control circuitry means coupled to said address storage means to make a selection of one of said memory location addresses from at least two of said addresses which are simultaneously transferred from said memory, said control circuitry means further capable of terminating said selection process; keyword storage means to store a keyword having a plurality of digits, the interpretation of each of said keyword digits respectively determining a different selection of said one address; interpreting means coupled between said keyword storage means and said control circuitry to interpret each of said keyword digits, in response to each interpretation said control circuitry making one of said selections, and further said control circuitry terminating said selection process in response to a keyword digit interpretation indicating termination.

3. An indirect addressing system to be used with a data processing system having a data storage memory with a plurality of addressable locations therein comprising: an address storage means wherein an address of at least one of the last two of said memory locations is stored; said address storage means coupled to said memory first circuitry means coupled to said address storage means and to said memory and capable of making a selection of one of said memory location addresses from said at least two of said memory location addresses which are simultaneously transferred from said memory; said first control circuitry further capable of terminating both said transfer of address information from said memory into said address storage means and said selection of said memory location addresses during said transfer; keyword storage means to store a keyword having a plurality of digits, the interpretation of each of said keyword digits respectively determining a different selection of one of said memory addresses; keyword shifting means connected to said keyword storage means to shift said keyword digits; interpreting means coupled between said keyword storage means and said first control circuitry to interpret each of said keyword digits, in response to each interpretation said control circuitry making one of said selections and eventually terminating both said transfer and said selection processes in response to a keyword digit interpretation indicating such termination; second control circuitry coupled to said interpreting means and said keyword shifting means to shift said keyword after a digit has been interpreted.

4. An indirect addressing system according to claim 3 wherein there is further included a monitoring means connected to said first control means and said keyword shifting means to detect when a keyword has been fully shifted and to initiate the generation of a control signal for the purpose of extracting an additional keyword in accordance therewith with said keyword being fully shifted.

5. An indirect addressing device comprising: a multiple address storage means wherein information relating to at least two addresses is stored; control circuitry means coupled to said multiple address storage means to make a selection of one of said addresses and to selectively terminate said selection process; keyword storage means to store a keyword having a plurality of digits, the interpretation of each of said keyword digits respectively determining a different selection of said addresses and selectively terminating of said selection process; interpreting means coupled between said keyword storage means and said control circuitry to interpret each of said keyword digits and in response to each interpretation enable said control means to make a selection of one of said addresses from at least two of said addresses and finally to enable said control means to terminate said selection process in response to a keyword digit interpretation indicating termination; and monitoring means connected to said control means and said keyword storage means to detect when a keyword has been fully interpreted and to initiate the generation of control signal for the purpose of extracting an additional keyword in accordance with said keyword being fully interpreted.

6. An indirect addressing system to be used with a data processing system having a data storage memory with a plurality of addressable locations therein comprising: an instruction decoding means to detect when an indirect addressing operation is to take place; an indirect addressing signal generating means coupled to said decoding means to generate a signal indicating an indirect addressing operation is taking place; control circuitry means coupled to said signal generating means to produce a plurality of control signals in response to said indirect addressing signal; an address storage means capable of receiving simultaneously data pertaining to at least two address locations and capable of selecting one address therefrom, including a register of bistable devices having a gate network to direct one of said addresses to a read-out portion of said registry in response to control signals being applied to said gate; network keyword storage means to store a keyword having a plurality of digits, the interpretation of each said keyword digits respectively determining a different selection of one of said addresses; interpreting means coupled between said keyword storage means and said control circuitry means having a capacity to interpret each of said keyword digits and provide, in conjunction with said control circuitry means, control signals to respectively cause said address storage means to make a different selection in response to each keyword digit interpretation; and circuitry means coupling said control circuitry to each address storage means to effect said selection.

7. An indirect addressing system according to claim 6, wherein there is further included keyword shifting means connected to said keyword storage means to shift said keyword digits and circuitry means coupling said keyword shifting means to said control circuitry means to cause said keyword shifting means to shift said keyword digits in accordance with control signals therefrom.

8. An indirect addressing system to be used with a data processing system having a data storage memory with a plurality of addressable locations therein comprising: an instruction decoding means to detect when an indirect addressing operation is to take place; an indirect addressing signal generating means coupled to said decoding means to generate a signal indicating an indirect address operation is taking place; control circuitry coupled to said signal generating means to produce a plurality of control signals in response to said indirect addressing signal; address storage means capable of simultaneously receiving data pertaining to at least two address locations and capable of selecting one address therefrom to enable a read out thereof; modification data storage means to modify an address read out from said address storage means; arithmetic means coupled to said address storage means and said modification data storage means to combine modification data with an address being processed to alter the latter; keyword storage means to store a keyword having a plurality of digits, the interpretation of each of said keyword digits, respectively determining a different one of said selections and further determining whether or not an address is modified by the information in said modification data storage device; interpreting means coupled between said keyword storage means and said control circuitry to interpret each of said keyword digits and to provide, in conjunction with said control circuitry, control signals to cause said address storage means to make a different selection in response to each keyword digit interpretation and to cause an address to be modified; first circuitry means coupling said control circuitry to said address storage means to effect said different selections of said one of at least two addresses, and second circuitry means coupling said control circuitry and said address storage means to said modification data storage means to cause said modification information to modify an address being processed.

9. An indirect addressing system according to claim 8, wherein there is further included a keyword shifting means coupled to said keyword storage means to shift said keyword digits when a keyword digit has been interpreted.

10. An indirect addressing system to be used with a data processing system having a data storage memory with a plurality of addressable locations therein comprising: an instruction decoding means to detect when an indirect addressing operation is to take place; an indirect addressing signal generating means coupled to said decoding means to generate a signal indicating an indirect addressing operation is taking place; control circuitry coupled to said signal generating means to produce a plurality of control signals in response to said indirect addressing signal; address storage means capable of receiving data pertaining to at least two address locations and capable of making a selection of one address therefrom to enable a read out thereof; modification data storage means to modify an address read out from said address storage means; arithmetic means coupled to said address storage means and said modification data storage means to combine modification data with an address being processed to alter the latter; keyword storage means to store a keyword having a plurality of digits, the interpretation of each of said keyword digits respectively determining a different selection of said addresses and further determining whether or not an address should be modified by the information in said modification data storage device; interpretating means coupled between said keyword storage means and said control circuitry to interpret each of said keyword digits and to provide, in conjunction with said control circuitry, control signals to respectively cause said address storage means to make a different selection in response to each keyword digit interpretation and to cause an address to be modified; first circuitry means coupling said control circuitry to each address storage means to effect said selection and second circuitry means coupling said control circuitry to said arithmetic means to selectively effect a modification of an address being processed.

11. An indirect addressing system to be used with a data processing system having a data storage memory with a plurality of addressable locations therein comprising: an instruction decoding means to detect when an indirect addressing operation is to take place; an indirect addressing signal generating means coupled to said decoding means to generate a signal indicating an indirect address operation is taking place; control circuitry coupled to said signal generating means to produce a plurality of control signals in response to said indirect addressing signal; address storage means capable of simultaneously receiving data pertaining to at least two address locations and capable of making a selection of one address therefrom to enable a subsequent read out of said one address; first circuitry means coupling said address storage means to said data storage memory to transmit said selected one address thereto and extract the contents of said selected one address therefrom; modification data storage means to modify an address read-out from said data storage means; arithmetic means coupled to said address storage means and said modification data storage means to combine modification data with an address being processed to alter the latter; keyword storage means to store a keyword having a pluarlity of digits, the interpretation of each of said keyword digits respectively determining different selections of said addresses and further determining whether or not an address should be modified by the information in said modification data storage device; interpreting means coupled between said keyword storage means and said control circuitry to interpret each of said keyword digits and to provide, in conjunction with said control circuitry, control signals to respectively cause said address storage means to make a different selection in response to each keyword digit interpretation and to selectively cause an address to be modified in said arithmetic means; second circuitry means coupling said control circuitry to said address storage means to effect each selection; and third circuitry means coupling said control circuitry to said arithmetic means to selectively effect a modification of an address being processed.

12. An indirect addressing system according to claim 11 wherein there is further included monitoring means connected to said control means and said keyword storage means to detect when a keyword has been fully interpreted and to initiate the generation of a control signal for the purpose of extracting an additional keyword in accordance therewith.

13. An indirect addressing system to be used with a data processing system having a data storage memory with a plurality of addressable locations therein comprising: an instruction decoding means to detect when an indirect addressing operation is to take place; an indirect addressing signal generating means coupled to said decoding means to generate a signal indicating an indirect addressing operation is taking place; control circuitry coupled to said signal generating means to produce a plurality of control signals in response to said indirect addressing signal; an address storage means capable of receiving data pretaining to at least two address locations and capable of making a selection of one address therefrom, including a register of bistable devices having a gate network to direct one of said last mentioned two addresses to a read-out portion of said register in response to control signals being applied to said gate network; keyword storage means to store a keyword having a plurality of digits, the interpretation of each of said keyword digits respectively determining different selections of said one address; interpreting means coupled between said keyword storage means and said control circuitry to interpret each of said keyword digits and provide, in conjunction with said control circuitry, control signals to respectively cause said address storage means to make a different selection in response to each keyword digit interpretation and circuitry means coupling said control circuitry to said address storage means to effect each selection.

14. An indirect addressing system to be used with a data processing system having a data storage memory with a plurality of addressable locations therein comprising: an instruction decoding means to detect when an indirect addressing operation is to take place; signal generating means coupled to said decoding means to generate an indirect addressing signal when an indirect address operation is taking place; control circuitry coupled to said signal generating means to produce a plurality of control signals in response to said indirect addressing signal; address storage means having a read out portion capable of receiving data pertaining to at least two address locations and capable of making a selection of one address therefrom to enable a read out thereof; first circuitry means coupling said address storage means to said data storage memory to transmit said selected one address thereto and extract the contents of said selected one address therefrom; modification data storage means to modify an address read out from said address storage means; arithmetic means coupled to said storage means and said modification data storage means to combine modification data with an address being processed to alter the latter; keyword storage means to store a keyword having a plurality of digits, interpretation of each of said keyword digits respectively determining a different selection of said one address and further determining whether or not an address should be modified by the information in said modification storage means; keyword shifting means to shift said keyword digits; interpreting means coupled between said keyword storage means and said control circuitry to interpret each of said keyword digits and to provide in conjunction with said control circuitry, control signals to respectively cause said address storage means to make a different selection in response to each keyword digit interpretation and to selectively cause an address to be modified in said arithmetic means; second circuitry means coupling said control circuitry to said address storage means to effect said selections; and third circuitry means coupling said control circuitry to said arithmetic means to selectively effect a modification of an address being processed.

References Cited by the Examiner
UNITED STATES PATENTS

| 3,029,414 | 4/62 | Schrimpf | 340—172.5 |
| 3,036,773 | 5/62 | Brown | 235—157 |

ROBERT C. BAILEY, *Primary Examiner.*

MALCOLM A. MORRISON, *Examiner.*